United States Patent [19]

Ishimoto et al.

[11] Patent Number: 5,778,138
[45] Date of Patent: Jul. 7, 1998

[54] MAGNETIC RECORDING AND REPRODUCTION APPARATUS FOR PREVENTING FIXED PATTERN NOISE FROM APPEARING IN A REPRODUCED IMAGE WHEN REPRODUCING AT HIGH SPEED

[75] Inventors: Junko Ishimoto; Sadayuki Inoue; Makoto Kumano, all of Nagaokakyo, Japan

[73] Assignee: Mitsubishi Denki Kabushiki Kaisha, Tokyo, Japan

[21] Appl. No.: 653,921

[22] Filed: May 22, 1996

Related U.S. Application Data

[63] Continuation of Ser. No. 168,381, Dec. 17, 1993, abandoned.

[30] Foreign Application Priority Data

Dec. 28, 1992 [JP] Japan ................ 4-360530

[51] Int. Cl.$^6$ .................................................. H04N 5/91
[52] U.S. Cl. ....................... 386/68; 386/81; 386/76
[58] Field of Search ........................ 360/10.1, 10.3, 360/70, 11.1; 386/68, 76, 80, 81, 86, 114

[56] References Cited

U.S. PATENT DOCUMENTS

| | | | |
|---|---|---|---|
| 4,626,936 | 12/1986 | Yoshino | 360/70 |
| 4,930,027 | 5/1990 | Steele et al. | 360/33.1 X |
| 4,943,872 | 7/1990 | Yamazaki | 360/8 |
| 5,027,235 | 6/1991 | Furuyama | 360/10.3 X |
| 5,181,146 | 1/1993 | Koga | 360/77.11 X |
| 5,276,557 | 1/1994 | Nagashima et al. | 360/32 X |

FOREIGN PATENT DOCUMENTS

| | | |
|---|---|---|
| 4-38745 | 2/1992 | Japan . |
| 4-186550 | 7/1992 | Japan . |

OTHER PUBLICATIONS

"An Experimental Digital VCR with 40mm Drum, Single Actuator and DCT–Base Bit–Rate Reduction" IEEE–vol. 34, No. 3, Aug. 1988–pp. 597–605.

"Measurement of Error Rate During High–Speed Playback in Digital VTR" (44th joint conference) Kyushu Chapter Meeting 1991, Okuma et al, p. 158.

*Primary Examiner*—Andrew L. Sniezek

[57] ABSTRACT

A magnetic recording and reproduction apparatus wherein the drum motor is controlled so that the rotation number of the drum during playback at the normal speed multiplied by N (N is an integer) changes by a fixed factor to $R(1+q/Q)$ (Q, q are integers satisfying $|q|<|Q|$), assuming the rotation number of the drum during normal playback as R rpm. Also a magnetic recording and reproduction apparatus wherein the drum motor is controlled so that the average rotation number of the drum during playback at the normal speed multiplied by N (N is an integer) becomes approximately R rpm by changing the rotation number of the drum periodically and combining a rotation number of R rpm or less and a rotation number of R rpm or more, assuming the rotation number of the drum during normal playback as R rpm.

10 Claims, 25 Drawing Sheets

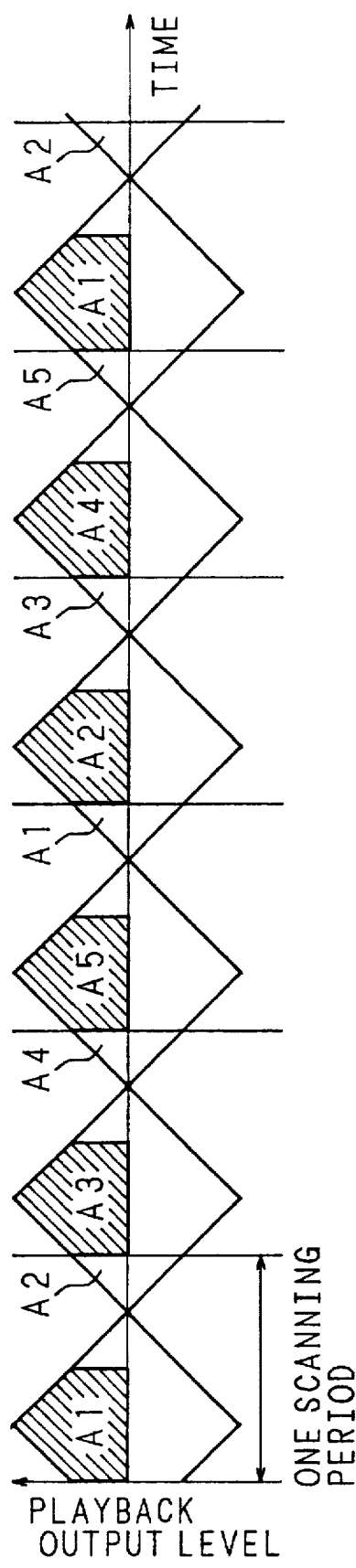
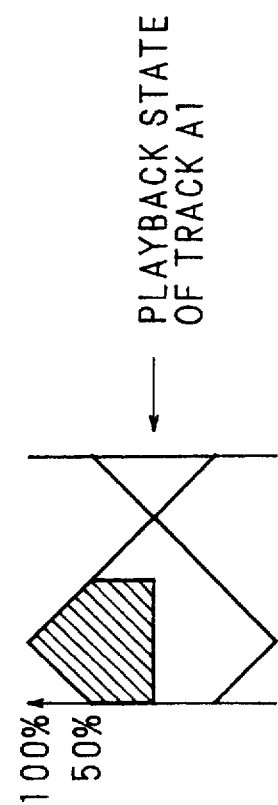
Fig. 4(b) Prior Art
Fig. 4(c) Prior Art

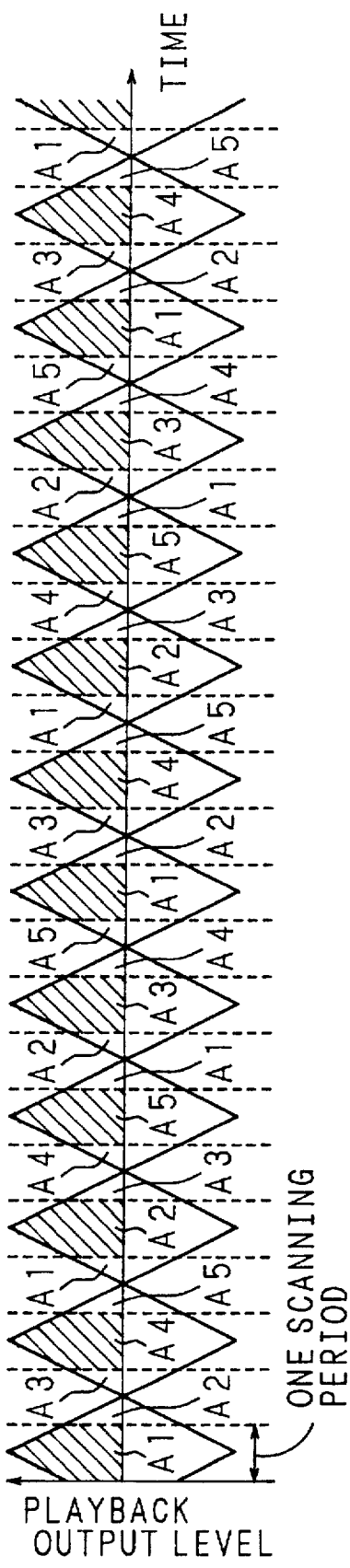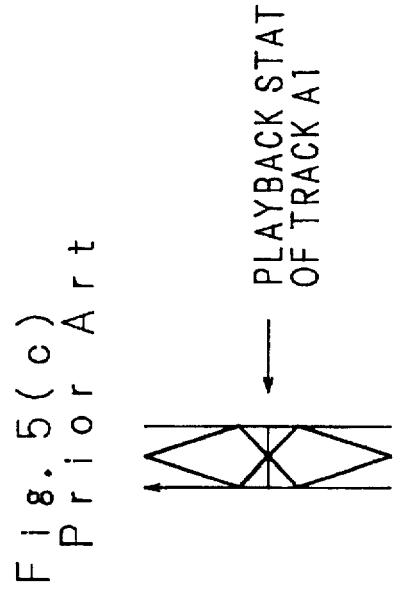
Fig.5(b) Prior Art
Fig.5(c) Prior Art

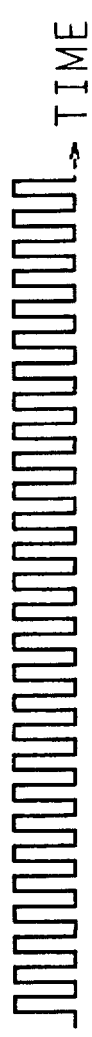
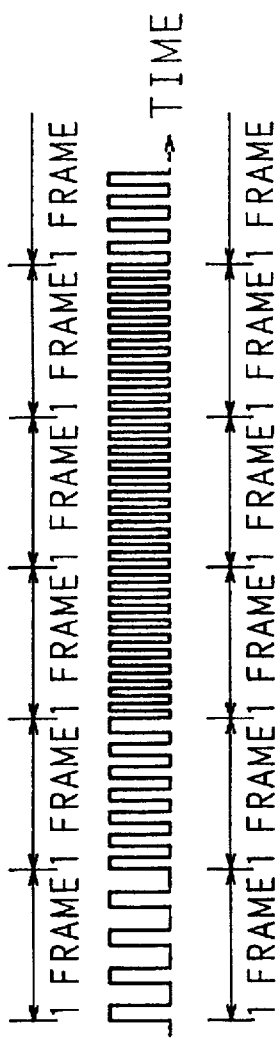
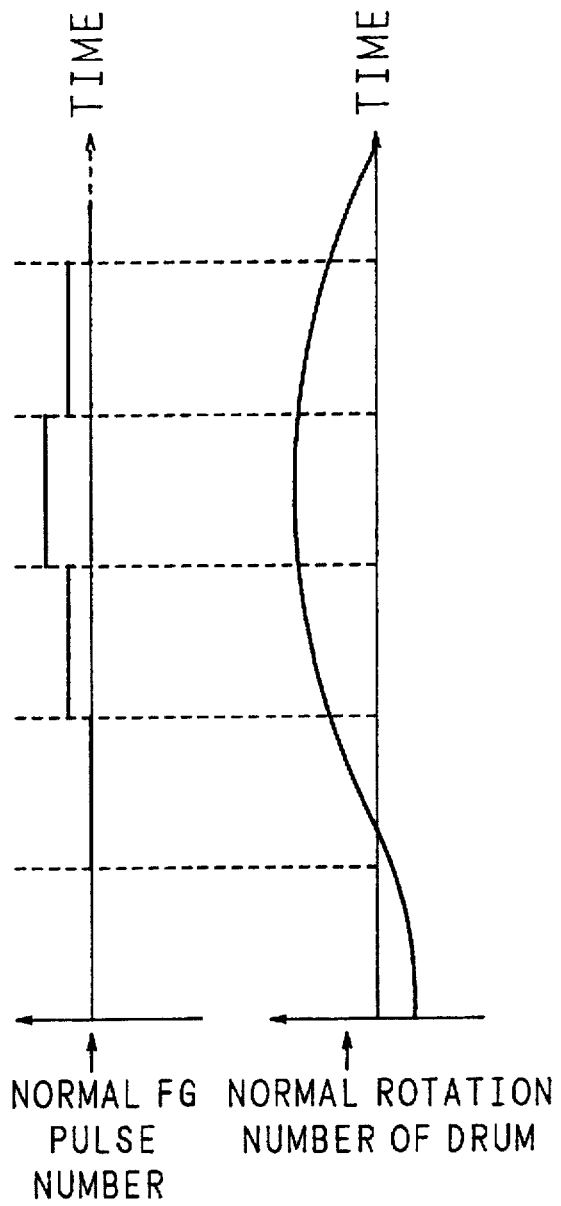
Fig. 15(a)
Fig. 15(b)
Fig. 15(c)
Fig. 15(d)

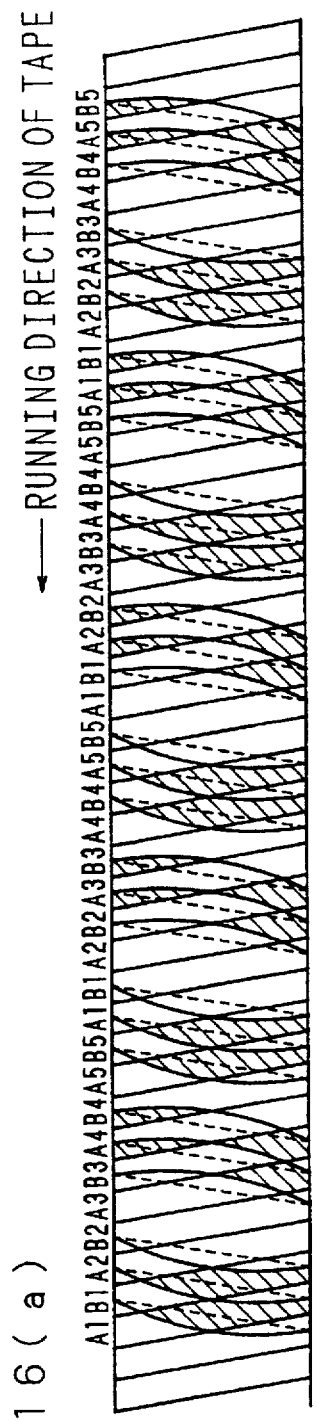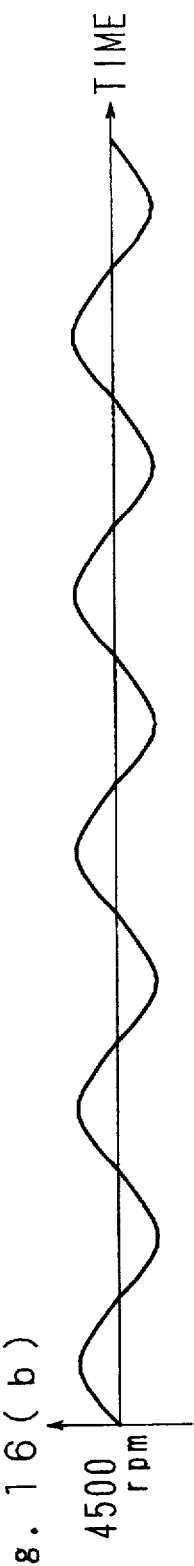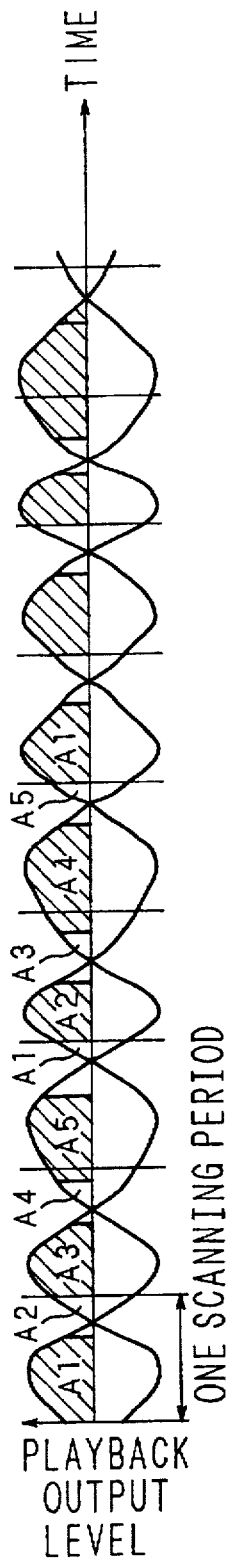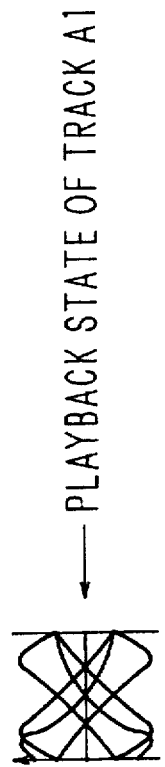
Fig. 16(a)
Fig. 16(b)
Fig. 16(c)
Fig. 16(d)

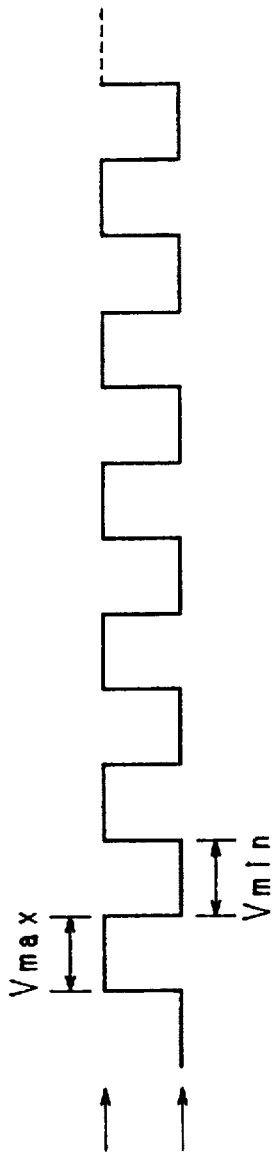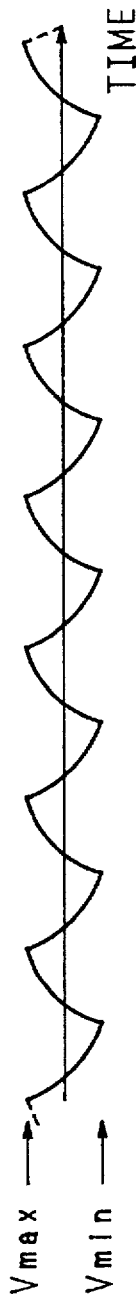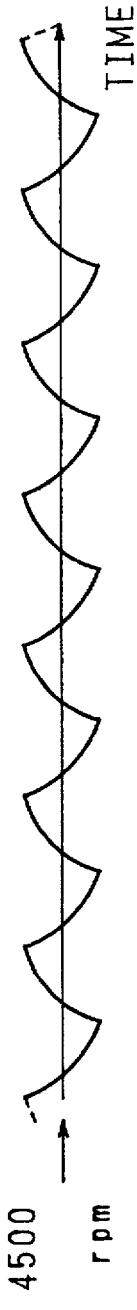

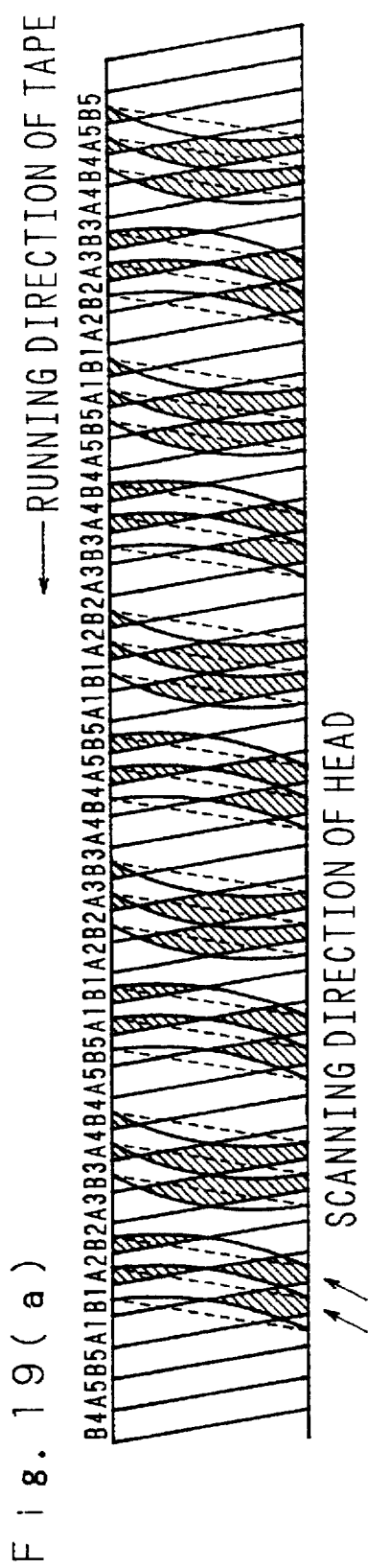
Fig. 19(a)
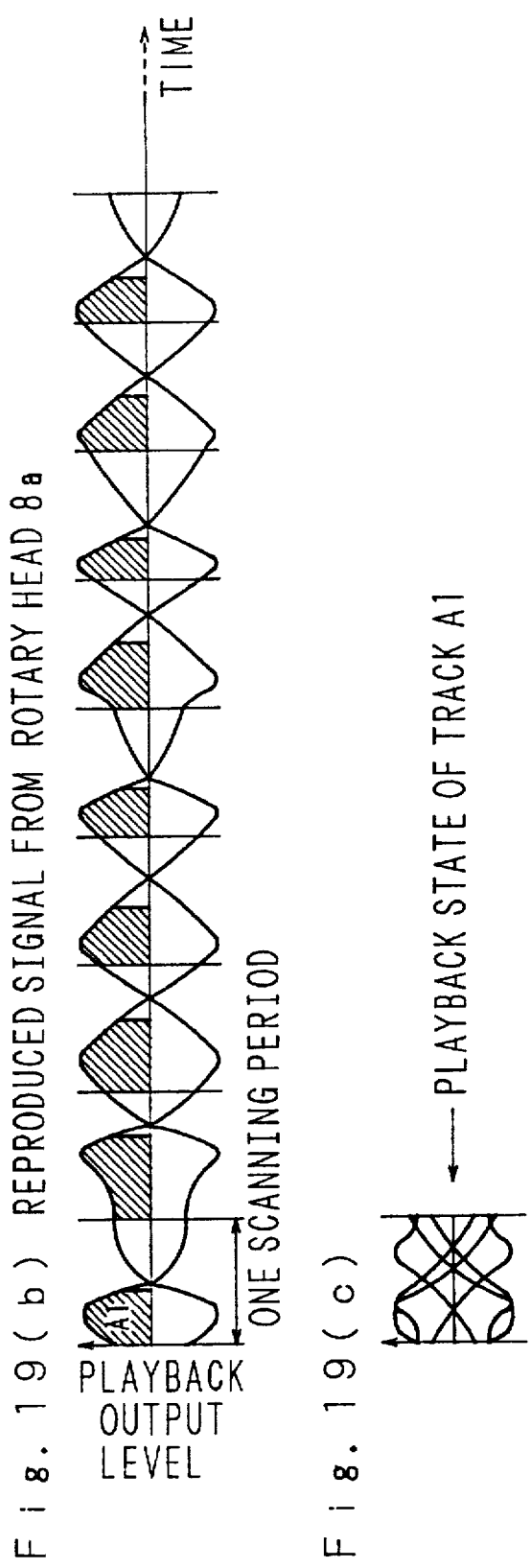
Fig. 19(b) REPRODUCED SIGNAL FROM ROTARY HEAD 8a
Fig. 19(c) PLAYBACK STATE OF TRACK A1

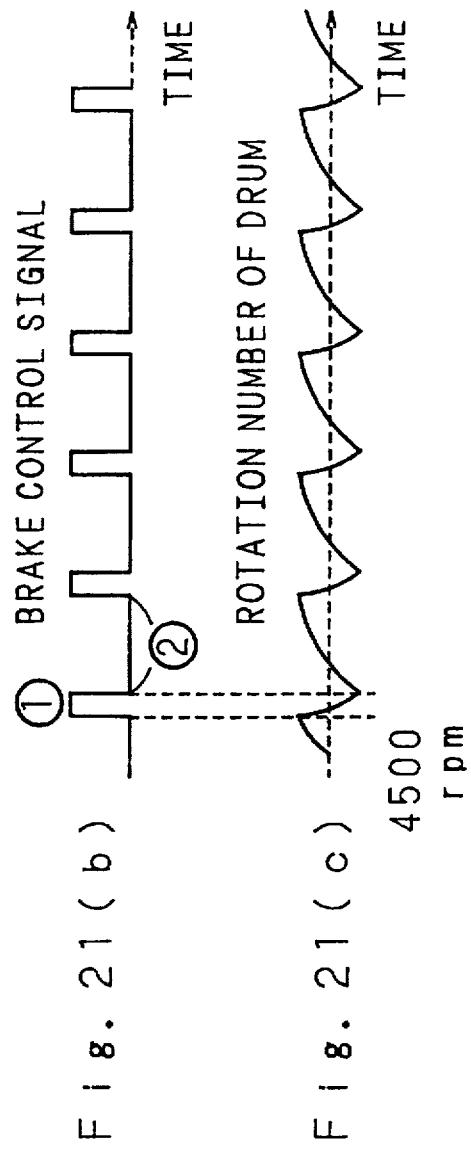

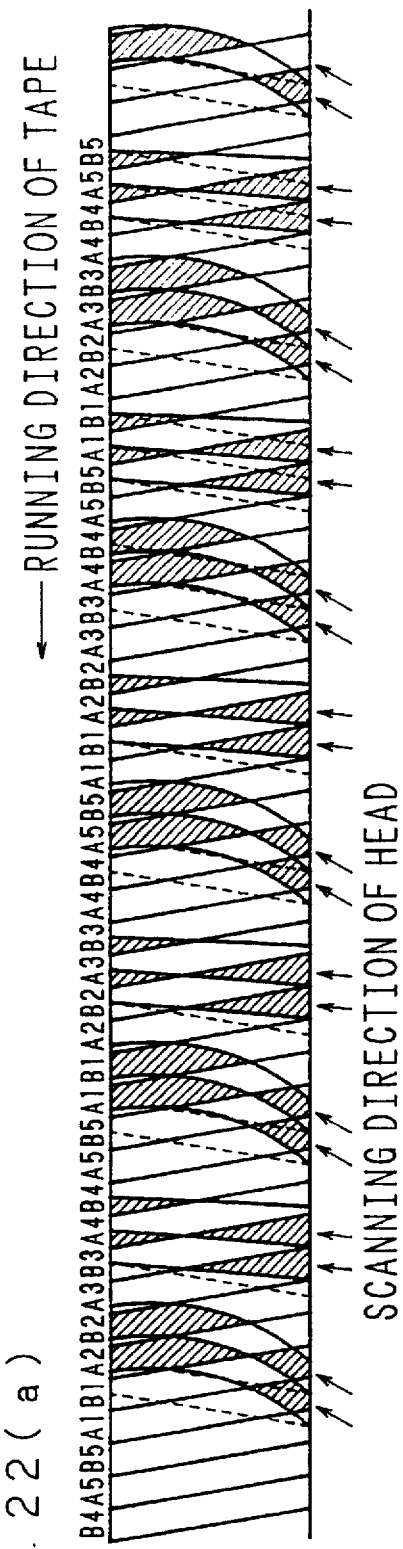
Fig. 22(a)
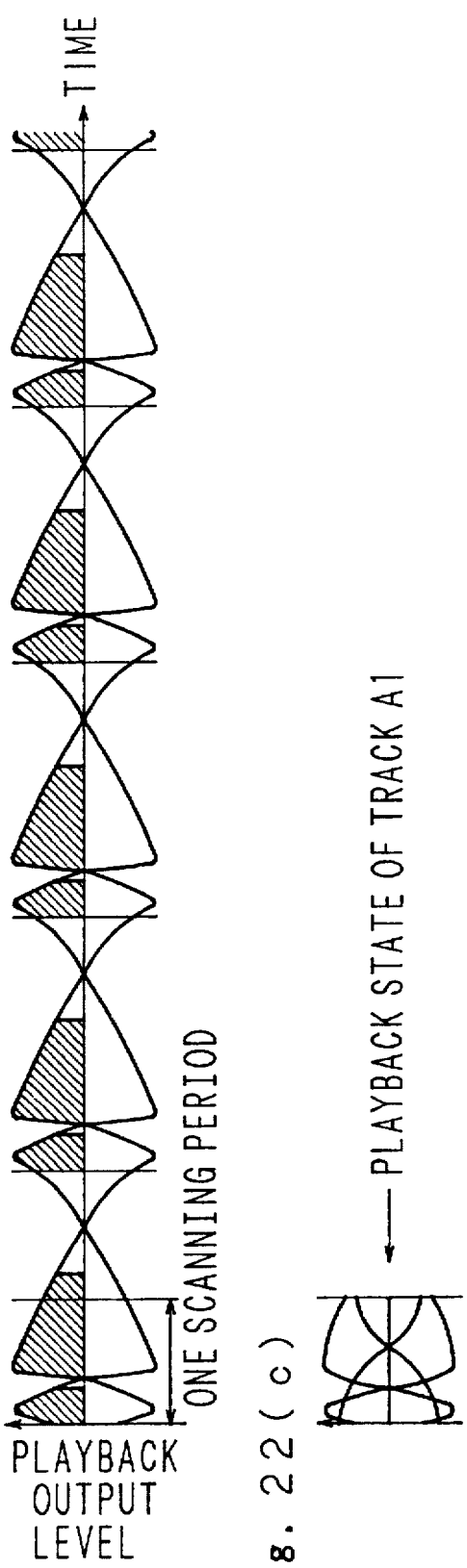
Fig. 22(b)
Fig. 22(c)

MAGNETIC RECORDING AND REPRODUCTION APPARATUS FOR PREVENTING FIXED PATTERN NOISE FROM APPEARING IN A REPRODUCED IMAGE WHEN REPRODUCING AT HIGH SPEED

This application is a continuation of application Ser. No. 08/168,381 filed on Dec. 17, 1993, now abandoned.

BACKGROUND OF THE INVENTION

1. Field of the invention

The present invention relates to a magnetic recording and reproduction apparatus wherein video signals are recorded and reproduced after being divided into a plurality of segments, and more particularly, to a method of controlling a rotary drum in order to obtain high-speed playback images of good quality.

2. Description of Related Art

As the screen sizes of home color television sets increase, video signal recording and reproduction media of higher quality have been increasingly used. Vigorous efforts have been made by many manufacturers to develop digital magnetic recording and reproduction apparati (hereinafter called digital VTR) for home use which are capable of digitizing video signals and recording them after band compression (high-efficiency encoding) and then decompressing and reproducing the recorded signals.

The method of recording and reproducing video signals in a home digital VTR of a known system will be described below, taking as an example the method of recording and reproducing employed by Philips Corporation which is described in "AN EXPERIMENTAL DIGITAL VCR WITH 40 MM DRUM, SINGLE ACTUATOR AND DCT-BASED BIT-RATE REDUCTION", the IEEE transactions on Consumer Electronics, Vol. 34, No.3 (August, 1988), pp. 597–605. The present embodiment will be described in the case of digital VTR employing 2-channel recording system.

FIG. 1 is a block diagram of the playback section of a magnetic recording and reproduction apparatus. In FIG. 1, numerals 8a, 8b denote rotary heads. Numeral 9 denotes a magnetic tape. Numerals 10a, 10b denote head amplifiers which amplify signals reproduced by the rotary heads 8a, 8b. Numerals 11a, 11b denote data detection circuits which detect data from the reproduced signals while detecting and correcting jitters in the reproduced signals. Numerals 12a, 12b denote digital demodulation circuits. Numeral 13 denotes an error correction decoding circuit. Numeral 14 denotes a high-efficiency decoding circuit which applies high-efficiency decoding to the output of the error correction decoding circuit 13 to restore the video signals. Numerals 15a, 15b, 15c denote D/A converters which convert digital signals to analogue signals. Numerals 16a, 16b, 16c denote output terminals.

FIG. 2 is a block diagram of the high-efficiency decoding circuit 14 installed in the magnetic recording and reproduction apparatus of the prior art. In FIG. 2, numeral 23 denotes a variable-length decoder which converts variable-length coded data into the original fixed-length data. Numeral 24 denotes a buffer memory for supplying the output from the variable-length decoder 23 at a fixed to an inverse adaptive quantizer 25. Numeral 26 denotes an inverse DCT circuit which applies inverse discrete cosine transform (hereinafter called inverse DCT) to the output data from the inverse adaptive quantizer 25. Numerals 27a, 27b denote field memories which apply a specified amount of delay to the reproduced digital signals which are outputted from the inverse DCT circuit 26, decode the block structure given during recording and output the decoded data. The high-efficiency decoding circuit 14 has the variable-length decoder 23, the buffer memory 24, the inverse adaptive quantizer 25, the inverse DCT circuit 26 and the field memories 27a, 27b.

The recording format of the magnetic recording and reproduction apparatus of the prior art will now be described below. FIG. 3(a) is a drawing illustrative of the relative positions of a magnetic tape and a drum in the magnetic recording and reproduction apparatus of the prior art employing 2-channel dual opposing heads, and FIG. 3(b) is illustrative of a track pattern formed on the magnetic tape. FIG. 3(a) shows the arrangement of the 2-channel rotary heads on the rotary drum, and FIG. 3(b) shows the track pattern of the recording tracks formed on the magnetic tape 9. The arrangement of the rotary heads shown in FIG. 3(a) is called the arrangement of 2-channel opposing heads.

In FIG. 3(a), numeral 60 denotes a rotary drum. Numeral 9 denotes a magnetic tape. Numerals 8a, 8b denote rotary heads of different channels. In this example of the prior art, the 2-channel rotary heads 8a, 8b are placed adjacent to each other on the rotary drum 60 as shown in FIG. 3(a), and during recording above mentioned 2-channel recorded signals are recorded on the magnetic tape 9 by the rotary heads 8a and 8b almost simultaneously (see FIG. 3(b)). In this example of the prior art, it is assumed that 8a is the rotary head of channel A (hereinafter called CH. A), and 8b is the rotary head of channel B (hereinafter called CH. B). Letters A and B in the drawing represent the recording tracks formed by rotary heads of different channels. The rotation number in this example of the prior art is assumed to be 4500 rpm. Consequently, video information of one frame is divided into 10 tracks as shown in FIG. 3 (b).

The method of recording wherein 2-channel recording heads record the video information of one frame separately in 10 tracks as shown in FIG. 3(b) is generally called a 2-channel 5-segment recording method. The number of channels refers to the number of reproduced signal processing circuits for processing the signals which are reproduced by the rotary heads. The number of reproduced signal processing sections here refers to the number of tracks which are reproduced simultaneously by a plurality of rotary heads. The number of segments refers to the number of tracks, recorded within a specified period of time when a same signal recording process is applied to video signals or audio signals over a specified period of time (for example, over 4 fields), divided by the number of channels. If this dividing operation leaves a remainder, the number of tracks recorded within the specified period of time is multiplied by an integer, then divided by the number of channels. The least integer obtained by this operation without remainder shall be the number of segments.

The operation of the reproduction system will now be described with reference to FIG. 1. The 2-channel reproduced signals which are reproduced from the magnetic tape 9 by the rotary heads 8a, 8b are amplified by the head amplifiers 10a, 10b and converted to digital data by the data detection circuits 11a, 11b with jitter (time-domain error) included in the reproduced signals being removed therefrom. The signals are then subjected to digital demodulation in the digital demodulation circuits 12a, 12b to be converted to reproduced digital signals, and are inputted to the error correction decoding circuit 13. The error correction decoding circuit 13 detects or corrects errors which may have been generated in the reproduced signals by means of check bits added to the signals beforehand (during recording). The reproduced signals which have passed the error detection and correction in the error correction decoding circuit 13 are subjected to variable-length decoding and inverse DCT transform in the high-efficiency decoding circuit 14 and then turned into original luminance signal Y and two chrominance signals CB, CR. These signals are then converted to analog data by the D/A converters 15a, 15b, 15c to be outputted on the output terminals 16a, 16b, 16c.

The operation of the high-efficiency decoding circuit 14 will be similarly described below with reference to FIG. 2. The reproduced digital signals which are outputted from the error correction decoding circuit 13 are subjected to variable-length decoding in the variable-length decoder 23 to be converted into fixed length data, which is then read in the buffer memory 24 at a fixed rate. The fixed length data which is read from the buffer memory 24 is inverse quantized by the inverse adaptive quantizer 25 and is inputted to the inverse DCT circuit 26 which applies inverse DCT to the reproduced digital signals. The reproduced luminance signal Y and the two reproduced chrominance signals CB and CR which have been subjected to inverse DCT are temporarily stored in the field memories 27a, 27b where they are delayed by specified amounts. Then these signals are decoded to dissolve the block structure (block structure given for the purpose of applying DCT in the unit of 8 pixels by 8 lines) which has been given during recording, and are outputted to the D/A converters 15a, 15b, 15c.

FIG. 4(a) shows the relation between the track pattern and the traces of scanning by the rotary heads 8a, 8b of the channels in the case of double-speed searching in a digital VTR equipped with 2-channel opposing heads as shown in FIG. 3. Because the two rotary heads have different azimuth angles, signals recorded in the shaded portions of the drawing represent the information reproduced by the rotary heads 8a, 8b of the respective channels.

FIG. 4(b) shows the signals reproduced by the rotary head 8a during double-speed playback, where time is plotted along the abscissa and the amplitude of the signal reproduced by the rotary head 8a of CH.A during high-speed playback being plotted along the ordinate. The description that follows assumes that such a portion of the signals reproduced by the rotary head 8a can be correctly restored by the error correction function and that the signals are reproduced with the amplitudes not less than 50% of the amplitudes obtained in normal speed playback. The above assumption made on the error correction are based on measurement data obtained on an actual apparatus, with details being published in the proceedings of the Joint Conference of Electricity-related Research Associations, Kyushu Chapter Meeting, 1991 (44th joint conference), p.158, "Measurement of error rate during high-speed playback in digital VTR", Okuma, et al. This example of the prior art will be described assuming, for the sake of convenience, that a half of a track is shifted in tracking.

In FIG. 4(a), A1, A2, . . . , A5 in the drawing represent five tracks which are recorded and reproduced by the rotary head 8a of CH. A, and B1, B2, . . . , B5 in the drawing represent five tracks which are recorded and reproduced by the rotary head 8b of CH. B.

FIG. 4(c) shows the playback state of the track A1 which is synthesized by using memory according to the playback output chart of FIG. 4(b). Data recorded at the bottom of the track A1 to the data recorded at the top of the track A1 are successively placed in the drawing starting at the leftmost position. Amplitudes of the reproduced signals are plotted along the ordinate. Shaded portion in the drawing represents the portion of data correctly reproduced. While the signals reproduced from the data recorded in the shaded portion, namely the bottom half of the track, have amplitudes not less than 50% that of normally reproduced, signals reproduced from the data recorded in the top half of the track do not have amplitudes not less than 50% that of normally reproduced. The playback state of the other nine tracks is similar to the above, and therefore drawing and description thereof are omitted.

In the DVTR of the prior art, as described above, no information is reproduced at all from the fixed position of each track during double-speed playback, and therefore the fixed portion of the screen is not updated at all making it impossible to obtain good multi-speed reproduced picture even when the reproduced information is synthesized by using a memory.

It is also known that information in the fixed position of each track is not reproduced at all so that fixed patterns appear when reproducing at a speed which is an integer times the regular speed in a VTR employing the segment recording system, as well as in the case of double-speed playback. (Refer to the U.S. patent application Ser. No. 024,488 "VIDEO SIGNAL RECORDING AND REPRODUCING APPARATUS" which is U.S. Pat. No. 5,339,165 on Aug. 16, 1994.)

If the tape running speed during multi-speed playback is replaced by the regular speed multiplied by a non-integer number which is determined by the formula (refer to the U.S. Pat. No. 5,339,165 however, it is possible to reproduce the data recorded at all positions of a track with 50% or greater playback output width with no fixed pattern appearing (details will be described later).

FIG. 5(a) shows the relation between track pattern and the traces of scanning by the rotary heads 8a, 8b of two channels in the case of searching at 1.5 times higher speed in a digital VTR equipped with 2-channel opposing heads shown in FIG. 3. Because the two rotary heads have different azimuth angles, signals recorded in the shaded portions of the drawing represent the information reproduced by the rotary heads 8a, 8b of the respective channels. FIG. 5(b) shows the signals reproduced by the rotary head 8a during playback at 1.5 times higher speed, where time is plotted along the abscissa and the amplitude of the signal reproduced by the rotary head 8a during high-speed playback is plotted along the ordinate. The description that follows assumes that such a portion of the signals reproduced by the rotary head 8a can be correctly restored by the error correction function and that the signals are reproduced with the amplitudes not less than 50% of the amplitudes obtained in normal speed playback. This example of the prior art will be described assuming that a half of a track is shifted in tracking.

FIG. 5(c) shows the playback state of the track A1 under reproduction which is synthesized by using memory according to the playback output chart of FIG. 5(b). Data recorded at the bottom of the track A1 to the data recorded at the top of the track A1 are successively placed in the drawing starting at the leftmost position. Amplitudes of the reproduced signals are plotted along the ordinate. As shown in FIG. 5(b), ten scans by the rotary head 8a completes one cycle of signal reproduction. FIG. 5(c) shows the playback state of the track A1 which is synthesized by using the memory. The drawing shows that the data recorded at all positions of the track A1 is restored. The playback state of the other nine tracks is similar to the above, though details will be omitted, and therefore drawing and description thereof are omitted.

As described above, the data recorded at all positions of every track can be restored by synthesizing the reproduced information by using the memory during playback at a speed 1.5 times higher than the regular speed in the DVTR of the prior art.

Similarly, a fixed pattern appears at a speed which is the regular speed multiplied by an integer, 6 for example, but the fixed pattern can be eliminated by replacing the ratio by a non-integer number, i.e. 6.5. The fixed pattern can be eliminated also by employing a speed 18.5 times the regular speed instead of 18.

However, conventional home VTR apparatuses of analog recording system marketed by many manufacturers include at least one model having a double-speed playback feature which is accepted by consumers as an important part of multi-speed function. Thus a home digital VTR must also have a double-speed playback feature as an essential part of the multi-speed function. When a tape of half an hour of playing time is reproduced at double-speed, playing time becomes 15 minutes. When the tape is reproduced at 1.5 times the regular speed, on the other hand, 20 minutes of playing time is required. Although it is possible to suppress the occurrence of fixed pattern also when other speeds are used such as 1.8 and 1.9 times the regular speed (refer to the U.S. Pat. No. 5,339,165, there has been a problem in that the efficiency of replacing the video information in the memory decreases and that high-speed playback leads to poor picture quality.

SUMMARY OF THE INVENTION

A principal object of this invention is to provide a magnetic recording and reproduction apparatus which eliminates the problem that no information is reproduced at all from the fixed portion of the track during double-speed playback (or, in general, during reproducing at a speed which is an integer times the regular speed) in a VTR system employing a multiple segment recording method.

In the magnetic recording and reproduction apparatus of this invention, the rotation number of the rotary drum is set at (1+q/Q) times the speed of normal playback while satisfying any one of the following conditions, when reproducing at N times the regular tape speed.

$$N \times Q \times k \neq 0 \ (mod \ S)$$ Equation (1)

where

N: Tape running speed

S: Number of segments (S≧2)

Q, q: Integers which satisfy the relationship |q|<|Q| k: Any natural number satisfying k≦S−1 whereby the function set forth in equation (1) is further explained using arbitrary variables a and b:

a≡b (mod m): (a−b) is divisible by a positive integer m, with a and b being integers.

Equation (1) holds for all values of k as specified above.

$$N \times Q \times k \equiv 0 \ (mod \ S)$$ Equation (2)

where

N: Tape running speed

S: Number of segments (S≧2)

Q, q: Integers which satisfy relationship |q|<|Q| k: Any natural number satisfying k≦S−1

The following equation holds for the least value of k which satisfies the above equation (2).

$$|Q+q|+k>S/cor.$$

where cor.: Ratio of data obtained correctly by error correction during high-speed playback.

With the arrangement described above, all the contents of the synthesized pictures in the field (or frame) memory are written over at a specified period, by changing the rotation number of the drum motor from the rotation number of the drum motor at normal speed playback. Thus, the problem that no information is reproduced at all from the fixed portion of the track during multispeed playback is eliminated, and multispeed reproduced picture of good quality can be obtained without fixed pictures.

In another magnetic recording and reproduction apparatus of this invention, when changing the rotation number of the drum motor from the rotation number at the drum motor of normal speed playback, because the reproduced signal rate during high-speed playback changes, at least two voltage controlled oscillators having different central frequencies (controlled so that one takes the central frequency for regular playback and another takes the frequency for high-speed playback) or at least two voltage controlled oscillators having different frequency control bandwidths (controlled so that one takes the frequency control bandwidth for regular playback and another takes the frequency control bandwidth for high-speed playback) are installed to detect the reproduced data. By switching these voltage controlled oscillators depending on whether reproducing at normal speed or high-speed, clock signals generated in the data detection circuit can be obtained reliably by means of a voltage controlled oscillator which corresponds to the frequency bandwidth regardless of whether reproducing at the normal speed or at a high speed.

In another magnetic recording and reproduction apparatus of this invention, when setting the rotation number of the drum motor to R rpm during recording, the rotation number is switched alternately between a value of R rpm or less and a value of R rpm or more, so that the average rotation number becomes approximately R rpm.

Specifically, the rotation number of the drum motor is controlled to become (1+a sin ωt) (a is a real number, ω is an angular frequency, t is time) times the rotation number of the drum of normal speed playback by using drum FG pulses during high-speed playback.

The above control procedure for high-speed playback may be replaced by such a control as switching the drum motor drive voltage between Vmax and Vmin of specified values at specified intervals.

The above control procedure for high-speed playback also may be replaced by such a control as applying braking force of a specified magnitude to the drum motor for a specified period of time by means of a braking mechanism control circuit according to the brake control signals generated at specified intervals from the drum motor control circuit, so that the rotation number of the drum decreases for a specified period of time.

As the rotation number of the drum is changed periodically, all the contents of the synthesized picture stored in the field (or frame) memory is written over periodically, so that multispeed reproduced picture of good quality can be obtained without a fixed picture even during multispeed playback and, because the average data reproducing rate is approximately equal to that of normal playback, it is made possible to carry out a satisfactory decoding process (error correction or high-efficiency decoding process).

In yet another magnetic recording and reproduction apparatus of the invention, the number of drum FG pulses is set to a value different from that of normal playback in the drum motor control circuit. The rotation number of the drum is controlled by the number of input FG pulses that cause the rotation number of the drum to change with respect to the rotation number of the drum during recording. With this arrangement, all the synthesized picture data stored in the field (or frame) memory is written over periodically, so that multispeed reproduced picture of good quality can be obtained without fixed pictures even during high-speed playback.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(a), 4(b), 4(c) are drawings explanatory of the playback states when reproducing at twice the normal speed by employing a 2-channel opposing heads shown in FIG. 3(a).

FIGS. 5(a), 5(b), 5(c) are drawings explanatory of the playback states when reproducing at 1.5 times the normal speed by employing the 2-channel opposing heads shown in FIG. 3(a).

FIGS. 15(a), 15(b), 15(c), 15(d) are drawings explanatory of the operations of the drum motor controller installed in the magnetic recording and reproduction apparatus of the fifth embodiment of the invention.

FIG. 16(a) is a drawing explanatory of the relation between the track pattern and the trace of the rotary head scanning when double-speed playback is carried out in the magnetic recording and reproduction apparatus of the fifth embodiment of the invention.

FIG. 16(b) is a drawing illustrative of changing the rotation number of the drum in the magnetic recording and reproduction apparatus of the fifth embodiment of the invention.

FIG. 16(c) is a drawing illustrative of the playback output from the rotary head of the magnetic recording and reproduction apparatus of the fifth embodiment of the invention.

FIG. 16(d) is a drawing illustrative of the playback state of one track in the magnetic recording and reproduction apparatus of the fifth embodiment of the invention.

FIGS. 18(a), (b), (c) are drawings explanatory of the operations of the drum motor controller installed in the magnetic recording and reproduction apparatus of the sixth embodiment of the invention.

FIG. 19(a) is a drawing explanatory of the relation between the track pattern and the trace of the rotary head scanning when double-speed playback is carried out in the magnetic recording and reproduction apparatus of the sixth embodiment of the invention.

FIG. 19(b) is a drawing illustrative of the playback output from the rotary head of the magnetic recording and reproduction apparatus of the sixth embodiment of the invention.

FIG. 19(c) is a drawing illustrative of the playback state of one track in the magnetic recording and reproduction apparatus of the sixth embodiment of the invention.

FIGS. 21(a), 21(b), 21(c) are drawings explanatory of the operations of the drum motor controller installed in the magnetic recording and reproduction apparatus of the seventh embodiment of the invention.

FIG. 22(a) is a drawing explanatory of the relation between the track pattern and the trace of the rotary head scanning when double-speed playback is carried out in the magnetic recording and reproduction apparatus of the seventh embodiment of the invention.

FIG. 22(b) is a drawing illustrative of the playback output from the rotary head of the magnetic recording and reproduction apparatus of the seventh embodiment of the invention.

FIG. 22(c) is a drawing illustrative of the playback state of one track in the magnetic recording and reproduction apparatus of the seventh embodiment of the invention.

DESCRIPTION OF THE PREFERRED EMBODIMENTS

The invention will now be described in detail in its preferred embodiments with reference to the attached drawings.

Embodiment 1

The first embodiment of the invention will be described below. The block diagram of the reproduction system of the magnetic recording and reproduction apparatus in the first embodiment of the invention is the same as that shown in FIG. 1 and the operation is also the same, therefore the description thereof will be omitted. The high-efficiency decoding circuit 14 is also constructed identically with that shown in FIG. 2 and the operation is also the same, therefore the description thereof will be omitted.

Figure 6:
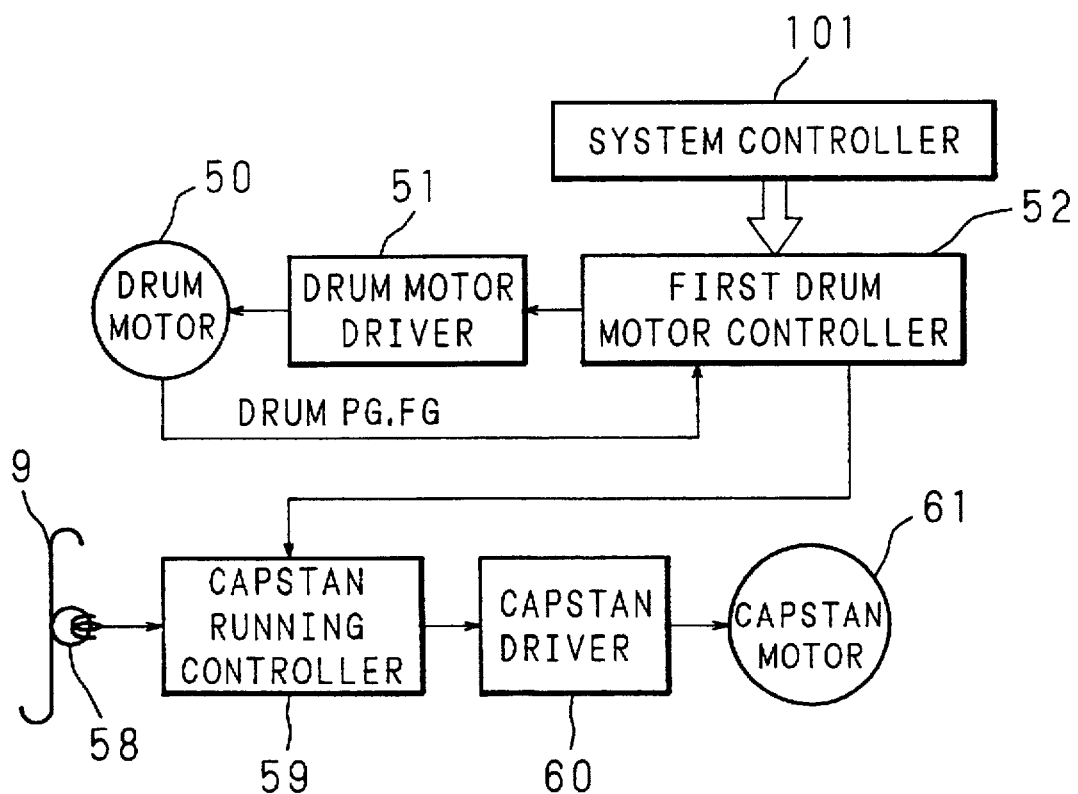
FIG. 6 is a block diagram of a drum motor controller and a capstan motor controller installed in the magnetic recording and reproduction apparatus of a first through fourth embodiments of the invention.

FIG. 6 is a block diagram of the controllers for the drum motor and the capstan motor installed in the magnetic recording and reproduction apparatus in the first embodiment of the invention. In FIG. 6, numeral 9 denotes a magnetic tape and numeral 101 denotes a system controller which outputs mode signals corresponding to various operational modes of the magnetic recording and reproduction apparatus. Numeral 50 denotes a drum motor, numeral 51 denotes a drum motor driver which generates drive voltage for driving the drum motor 50. Numeral 52 denotes a first drum motor controller for controlling the rotation of the drum motor 50 in accordance with the mode signal outputted from the system controller 101 and the drum PG and drum FG signals are output from the drum motor 50 according to the operation mode. Numeral 58 denotes a control head, numeral 61 denotes a capstan motor, numeral 60 denotes a capstan driver which generates drive voltage for driving the capstan motor 61, numeral 59 denotes a capstan running controller which controls the phase and running of the capstan motor 61 by the control signals outputted from the first drum motor controller 52 and the control head 58.

Now the operations of the controllers for the drum motor 50 and the capstan motor 61 during normal playback will be described with reference to FIG. 6. The first drum motor controller 52 controls the rotation of the drum motor 50 in accordance with the normal playback mode signal outputted from the system controller 101 and drum PG and drum FG signals are outputted from the drum motor 50. The first drum motor controller 52 also generates a reference signal which is supplied to the capstan running controller 59 to control the capstan during playback. The drum motor driver 51 generates drive voltage for driving the drum motor 50 according to the control signal outputted from the first drum motor controller 52. On the other hand, the capstan running controller 59 controls the tape running speed in accordance with the CTL signal outputted from the control head 58 and, at the same time, controls the running of the magnetic tape 9 by using the reference signal outputted from the first drum motor controller 52 and the CTL signal. The capstan driver 60 generates drive voltage for driving the capstan motor 61 according to the control signal outputted from the capstan running controller 59.

Now the operations of the controllers for the drum motor 50 and the capstan motor 61 of this embodiment during double-speed playback will be described with reference to FIG. 6. The first drum motor controller 52 controls the drum motor 50 in accordance with the double-speed playback mode signal outputted from the system controller 101 and drum PG and drum FG signals are outputted from the drum motor 50, so that the rotation number of the drum motor 50 is increased by 10% over that the normal playback rotation number, and generates a reference signal to control the capstan during playback. The drum motor driver 51 generates a drive voltage for driving the drum motor 50 according to the control signal outputted from the first drum motor controller 52 so that the rotation number of the drum motor 50 is increased by 10% over that of the normal playback rotation number. On the other hand, the capstan running controller 59 applies phase control of rotary heads 8a, 8b by using the reference signal outputted from the control head 58 and the CTL signal. The capstan driver 60 generates a drive voltage for driving the capstan motor 61 according to the control signal outputted from the capstan running controller 59.

Figure 7:
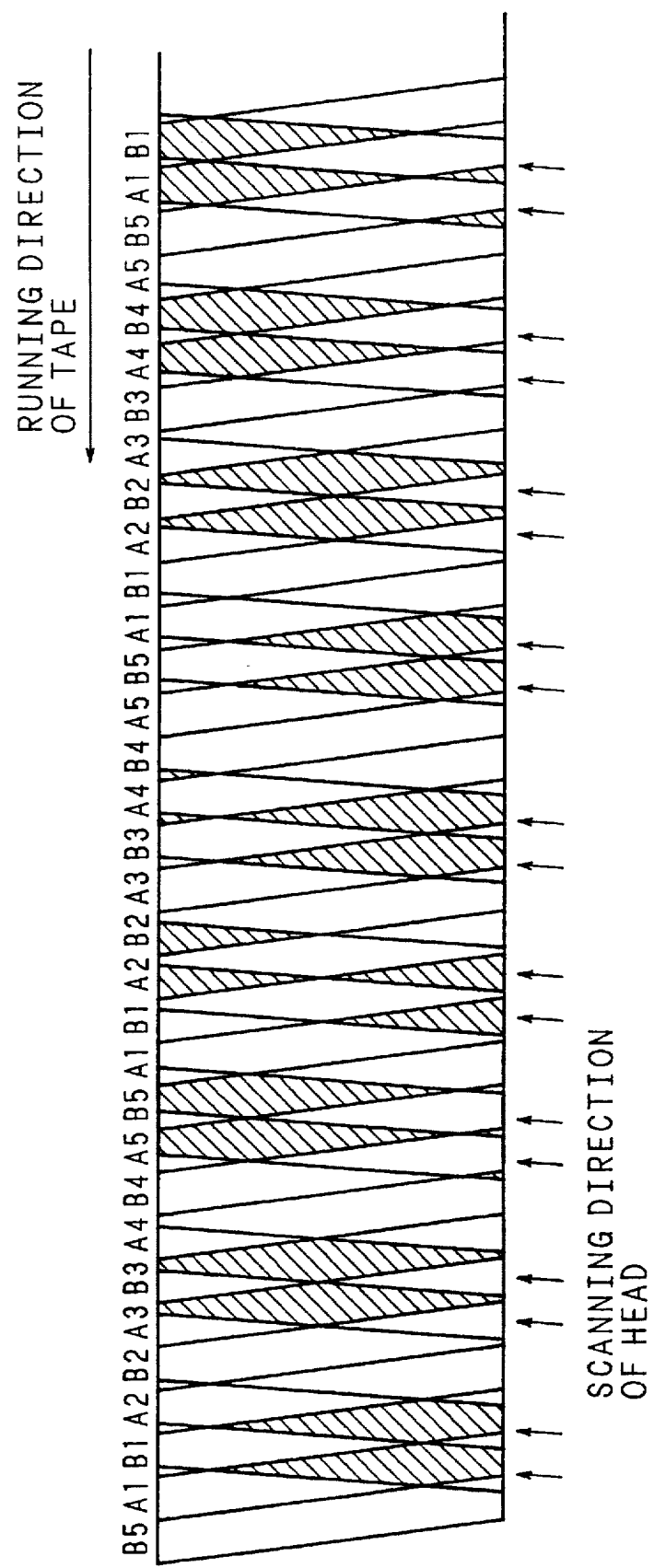
FIG. 7 is a drawing explanatory of the relation between a track pattern and a trace of the rotary head scanning when double-speed playback is carried out by increasing the rotation number of the drum by 10% over the normal speed, in the magnetic recording and reproduction apparatus of the first embodiment of the invention.

The operation of the invention will now be described below with reference to FIG. 7. FIG. 7 is a drawing explaining the relation between the track pattern and the trace of 2-channel rotary head scanning during double-speed playback with the rotation number of the drum being increased by 10% over that of the normal playback rotation number in the magnetic recording and reproduction apparatus of the first embodiment of the invention. The trace of scanning of the rotary head when the rotation number of the drum is changed to 1.1 times that of normal playback (namely, for example, a 10% increase from the normal 4500 rpm to 4950 rpm) is shown. When the rotation number of the drum is increased by 10%, 1.1 tracks are scanned in the period of time taken by the rotary head to scan one track with the normal rotation number of the drum (one head scan period).

Figure 9:
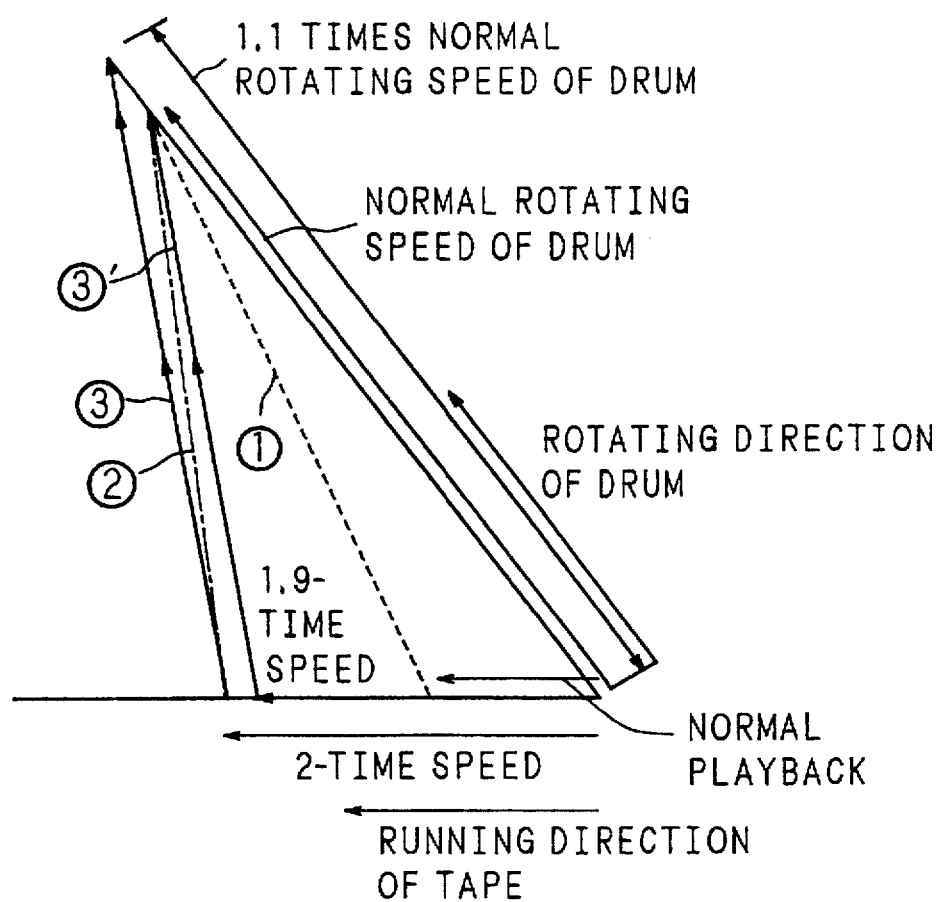
FIG. 9 is a drawing explanatory in detail of the trace of the scanning of the rotary head shown in FIG. 7.

The trace of rotary head scanning during double-speed playback with the rotation number of the drum being increased by 10% will now be described in detail with reference to FIG. 9. FIG. 9 shows the directions of drum revolution and tape running. Trace of rotary head scanning during normal playback with the normal rotation number of the drum is represented by the vector indicated by ① in the drawing which is obtained by synthesizing the drum rotation number vector and the tape running speed vector. Similarly, the trace of rotary head scanning during double-speed playback with the normal rotation number of the drum is represented by the vector indicated by ② in the drawing. Also the trace of the rotary head scanning during double-speed playback with 1.1 times the normal rotation number of the drum is represented by the vector indicated by ③ in the drawing. Then, let the vector indicated by ③ be translated so that it passes the end points of the vectors ①, ② and be vector ③' such that the vector ③' represents the trace of the rotary head scanning during double-speed playback with 1.1 times the normal rotation number of the drum. It will not be necessary to point out that the vector ① corresponds to the rotation number of the drum of the normal speed playback and therefore takes the trace of head scanning for normal playback because 1/1=1 ([tape running speed]/[drum revolution speed]), and the vector ② corresponds to twice the drum revolution speed of the normal playback and therefore takes the trace of head scanning for double-speed playback because 2/1=2, whereas the vectors ③ and ③' correspond to twice the drum revolution speed with 1.1 times the normal drum rotation number, and therefore apparently takes the trace of head scanning for about 1.9 times the normal playback because 2/1.1=1.9.

From the discussion described above, the trace of the rotary head scanning during double-speed playback with 1.1 times the normal rotation number of the drum becomes as shown in FIG. 7. Because the rotary heads have azimuth angles different from each other, signals corresponding to the shaded portion in the drawing represent the information reproduced by the rotary heads 8a, 8b of the respective channels. FIG. 8(a) shows the signals reproduced by the rotary head 8a during double-speed playback, with time being plotted along the abscissa, and the amplitude of the reproduced signal outputted from the rotary head 8a during high-speed playback being plotted along the ordinate. The description that follows assumes that such a portion of the signals reproduced by the rotary head 8a can be correctly restored by the error correction function, that the amplitude of the reproduced signal is not less than 50% of the amplitude obtained during normal speed playback.

FIG. 7 and FIG. 8(a) show that the start position of rotary head scanning returns to the initial position after scanning 11 times. The output pattern of the reproduced signals returns to the initial pattern when the rotary head has scanned 40 tracks wherein four frames of video data are recorded.

Figure 8:
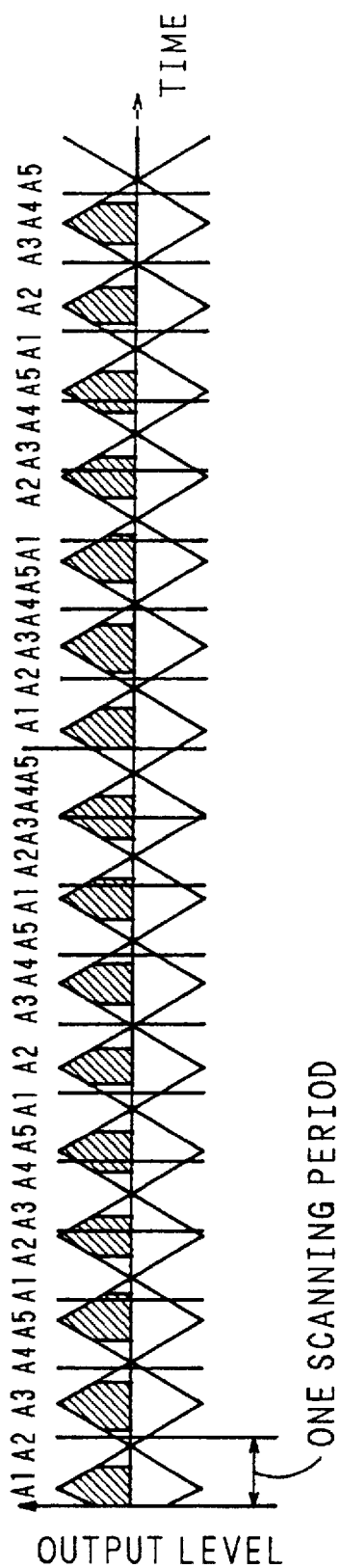
FIG. 8(a) is a drawing illustrative of the playback output from the rotary head in the case shown in FIG. 7.
FIG. 8(b) is a drawing illustrative of the playback state of one track in the case shown in FIG. 7.

FIG. 8(b) shows the playback state of the track A1 synthesized by using the memory according to the playback output chart shown in FIG. 8(a). The data recorded at the bottom of the track A1 to the data recorded at the top of the track A1 are successively placed in the drawing starting at the leftmost position. The amplitudes of the reproduced signals are plotted along the ordinate. As shown in FIG. 8 (b), the data recorded at all positions of the track A1 is restored. The data can be obtained at all positions of the other nine tracks similarly, though details will be omitted.

As described above, although the information recorded in the fixed position of a track is not reproduced at all resulting in a fixed pattern appearing in the reproduced picture when double-speed playback is carried out with the normal rotation number of the drum, the output pattern of the reproduced signals shifts a little as shown in FIG. 8(a) by increasing the rotation number of the drum by 10% over the normal value in a home digital VTR, thus reproduced information from all positions of each track can be obtained by synthesizing the reproduced information by using the memory even during double-speed playback.

As described above, when the drum motor controller installed in the magnetic recording and reproduction apparatus of this embodiment is used, the problem that the information recorded at fixed positions of the recording track is not reproduced at all times can be resolved by increasing the rotation number of the drum by 10% over the normal rotation number of the drum in the double-speed playback mode. Therefore, because all the contents of the synthesized pictures stored in the field memory are written over periodically, high-speed reproduced pictures of excellent quality without a fixed picture pattern can be obtained.

Although this embodiment is described taking a case of increasing the rotation number of the drum by 10% as an example, the rate of changing the rotation number is not limited to this value. Also this embodiment is described taking a case of changing the rotation number of the drum in the case of double-speed as an example, though this embodiment is not restricted to this case and it may be combined with the normal speed multiplied by another integer or a non-integer number.

Embodiment 2

The second embodiment of the invention will now be described. In the first embodiment, a case of increasing the rotation number of the drum by 10% over the normal rotation number of the drum was described as an example of changing the rotation number of the drum by a little from the normal rotation number of the drum during double-speed playback. In this case, it is possible to reproduce all the tracks so that no fixed pattern (a portion of the memory wherein the information is not written over at all) appears. In this embodiment, governing equations will be derived for a case when no fixed pattern appears in the synthesized picture during multispeed playback. The governing equation employed in this embodiment is based on the U.S. patent application Ser. No. 024,488 issued as U.S. Pat. No. 5,339,165 on Aug. 16, 1994.

In the U.S. Pat. No. 5,339,165, the relation between the number of segments when no fixed pattern appears during playback at the normal speed multiplied by a non-integer number and the tape running speed at the normal speed multiplied by a non-integer number is represented by the following governing equation (A). When the tape running speed is set at the normal speed multiplied by a non-integer number (N+m/M) so that no fixed pattern appears during high-speed playback, no fixed pattern will appear if the number of segments S is determined in a range of S≧2 so that an integer r which satisfies the following condition does not exist;

$$(N+m/M) \times M \times k = r \times S \tag{A}$$

where

N: integer,

M: 2, 3, 4, ...

m: 1, 2, 3, ... |M|>|m| k: any natural number satisfying k≦S−1.

The restriction by the U.S. Pat. No. 5,339,165 on determining the tape running speed is based on the following reason. When reproducing at the normal speed multiplied by (N+m/M) in a VTR employing the segment recording method, contents of the frame memory are written over at an interval of M frames. However, when the above condition is satisfied (namely, such a natural number r as satisfies (N+m/M)×M×k=r×S exists), the interval becomes k×M/S (M>k× M/S) and therefore the cycle returns to the start before all the contents of the video signals are written over. The result is a fixed pattern in the portion where the video signals are not written over which degrades quality of multispeed reproduced pictures.

Based on the above description, the governing equation (1) from which the relationship between the number of segments S (S≧2) and the rotation number of the drum when no fixed pattern appears during playback at the normal speed multiplied by N (N is an integer) will be described below. Let the rotation number of the drum during normal playback be R rpm and the rate of change in the rotation number be q/Q. Thus the rotation number of the drum during playback at the normal speed multiplied by N becomes R(1+q/Q) rpm. (That is, the trace of scanning the track of the rotary head 8 in this case becomes identical with that of (Q/(Q+q))×N times the normal speed as described in the above embodiment 1.)

$$N \times Q \times k \not\equiv 0 \pmod{S} \tag{Equation (1)}$$

where

Q, q: Integers which satisfy relation $|q|<|Q|$ k: Any natural number satisfying $k \leq S-1$ whereby the function set forth in equation (1) is further explained using arbitrary variables a and b:

a≡b (mod m): (a−b) is divisible by a positive integer m, with a and b being integers.

When the tape running speed and the rotation number of the drum are determined to satisfy the above equation (1) for all values of k, no fixed pattern appears when reproducing at the normal speed multiplied by N. Equation (1) is a variation of equation (A) where the left side of the equation (M×N+m) is replaced by QN to derive equation N×Q×k=r×S (called equation (B)) and no integer r exists to satisfy the equation (B) for all natural numbers, representing the condition in the form of mod. The reason for the restriction by the governing equation for the rotation number of the drum when no fixed pattern appears during playback at the normal speed multiplied by N in this embodiment will be described below. When reproducing at a rotation number of the drum R(1+q/Q) rpm in a VTR employing the segment recording method, contents of the frame memory are written over at an interval of Q frames (time) (the rotary head scans the magnetic tape (Q+q) times). However, when the above condition is satisfied (namely such a natural number k exists as N×Q×k≡0 (mod S)), the interval becomes k×Q/S (Q>k×Q/S) and therefore the cycle returns to the start before all the contents of the video signals are written over, resulting in a fixed pattern appearing in the portion where the video signals are not written over at all which degrades the quality of multispeed playback pictures quality.

Also when the speed is combined with the normal speed multiplied by a non-integer number (N+m/M) in the above equation (1), a fixed pattern can be prevented from appearing during playback at the normal speed multiplied by (N+m/M), if the tape running speed and the rotation number of the drum are determined so that the following equation (1') is satisfied for all values of k, though details will not be described.

$$(M \times N + m) \times Q \times k \not\equiv 0 \ (mod \ S) \tag{1'}$$

where

Q, q: Integers which satisfy relationship $|q|<|Q|$ k: Any natural number satisfying $k \leq S-1$ Now a case of satisfying the equation (1) wherein the rotation number of the drum is changed by a factor of 1/11 from R rpm to R(1+1/11) rpm during double-speed playback will be described below.

The block diagram of the drum motor control section of the magnetic recording and reproduction apparatus in the second embodiment of the invention is the same as that of the first embodiment shown in FIG. 6 and the operation is also the same, therefore the description thereof will be omitted.

Figure 10:
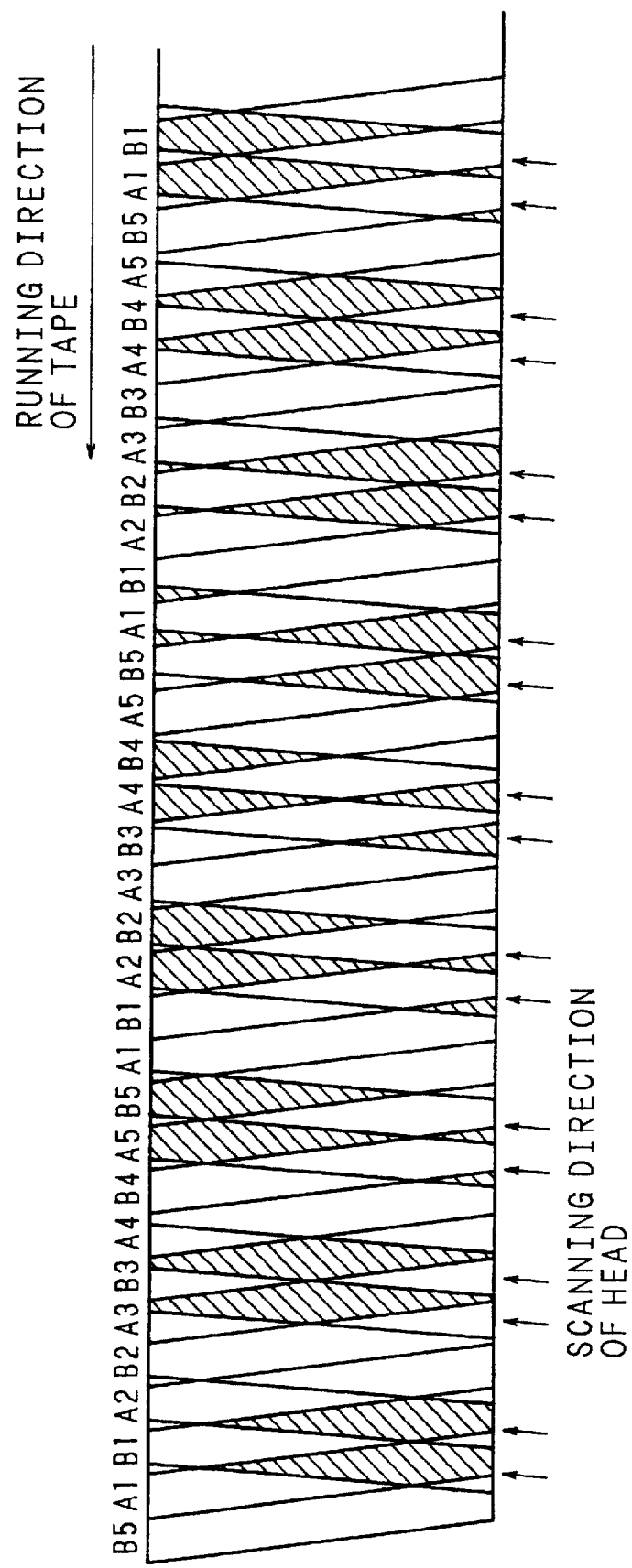
FIG. 10 is a drawing explanatory of the relation between the track pattern and the trace of the rotary head scanning when double-speed playback is carried out by increasing the rotation number of the drum by about 9% over the normal speed, in the magnetic recording and reproduction apparatus of the first embodiment of the invention.
Figure 11A:
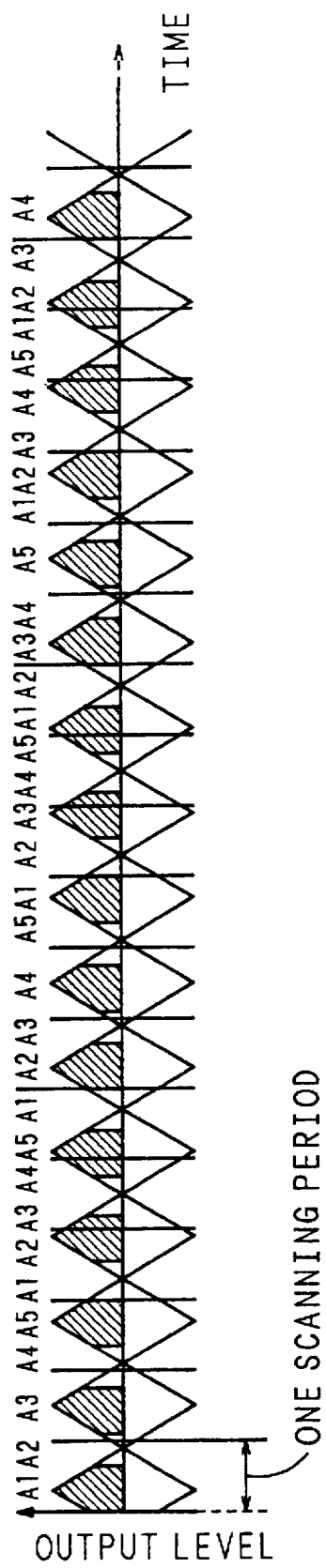
FIG. 11(a) is a drawing illustrative of the playback output from the rotary head in the case shown in FIG. 10.

Now a case of double-speed playback wherein the rotation number of the drum is changed by a factor of 1/11 from the normal 4500 rpm to about 4945 rpm will be described below with reference to FIG. 10. In equation (1), N=2, Q=11 and q=1. In this embodiment, because 2-channel recording is carried out and one frame is recorded in 10 tracks, the number of segments is S=5. Thus, the left-hand side of equation (1) becomes 22×k and values k=1, 2, 3, 4 all satisfy the equation (1). FIG. 10 shows the relation between the track pattern and the trace of scanning by the 2-channel rotary heads 8a, 8b during double-speed search in a digital VTR equipped with the 2-channel opposing heads shown in FIG. 3. The trace of scanning when the rotation number of the drum is increased 1.0909 ... times (namely by 9.09% from normal 4500 rpm to 4945 rpm) is shown. The trace of scanning during double-speed playback with the normal rotation number of the drum becomes as shown in FIG. 10 because the head scans 1.0909 tracks within one head scan period wherein the head scans one track. Because the rotary heads have azimuth angles different from each other, signals corresponding to the shaded portion in the drawing represent the information reproduced by the rotary heads 8a, 8b of the respective channels. FIG. 11(a) shows the signals reproduced by the rotary head 8a during double-speed playback, with time being plotted along the abscissa, and the amplitude of the reproduced signal outputted from the rotary head 8a during high-speed playback being plotted along the ordinate. The description that follows assumes that such a portion of the signals reproduced by the rotary head 8a can be correctly restored by the error correction function and that the amplitude of the reproduced signal is not less than 50% of the amplitude obtained during normal speed playback.

FIG. 10 and FIG. 11(a) show that the start position of rotary head scanning returns to the initial position after scanning 30 times. Also the output pattern of the reproduced signals returns to the initial pattern when the rotary head has scanned 110 tracks wherein 11 frames of video data are recorded.

Figure 11B:
FIG. 11(b) is a drawing illustrative of the playback state of one track in the case shown in FIG. 10.

FIG. 11(b) shows the playback state of the track A1 synthesized by using the memory according to the playback output chart shown in FIG. 11(a). Data recorded at the bottom of the track A1 to the data recorded at the top of the track A1 are successively placed in the drawing starting at the leftmost position. Amplitudes of the reproduced signals are plotted along the ordinate. As shown in FIG. 11 (b), data recorded at all positions of the track A1 is restored. Data recorded in the other nine tracks is also obtained similarly to the above, though details will be omitted.

As described above, although the information recorded in the fixed position of a track is not reproduced at all resulting in a fixed pattern appearing in the reproduced picture when double-speed playback is carried out with the normal rotation number of the drum, the output pattern of the reproduced signals shifts a little as shown in FIG. 10 by changing the rotation number of the drum from the value of normal playback to satisfy the equation (1) in a home digital VTR, thus reproduced information from all positions of each track can be obtained by synthesizing the reproduced information by using the memory even during double-speed playback.

Although a case of increasing the drum revolution speed by 1/11 times the normal speed in double-speed playback is described for this embodiment, a similar effect can be obtained with the normal speed multiplied by other integers or non-integer numbers, and other factors of changing the rotation number of the drum.

Embodiment 3

The third embodiment of the invention will now be described. There are cases where fixed patterns do not appear even when the equation (1) shown in the second embodiment is not satisfied. In this embodiment, conditions for fixed pattern not to appear even when the equation (1) is not satisfied will be shown.

Although it was described in the second embodiment that no fixed pattern appears even during playback at the normal speed multiplied by N (N is an integer) when the equation (1) is satisfied, there are cases where fixed patterns do not appear during playback at the normal speed multiplied by N even when the above equation (1) is not satisfied, if the following equation (2) is satisfied.

$|Q+q|\times k>S/cor.$          (2)

where

Q, q: Integers which satisfy relation $|q|<|Q|$ k: Any natural number satisfying $k \leq S-1$ cor.: Rate of data correctly restored by the error correcting function during high-speed playback.

$a \equiv b \pmod{m}$: (a–b) is divisible by a positive integer m, with a and b being integers.

When equation (2) is satisfied for the least value of k which does not satisfy the equation (1), namely the least value of k which satisfies $N \times Q \times k \equiv 0 \pmod{S}$, there is a case when no fixed pattern appears when reproducing at the normal speed multiplied by N. S is the number of segments ($S \geq 2$) and q and Q are coefficients when the factor of changing the rotation number is (q/Q). Thus when the rotation number of the drum during normal speed playback is R rpm, the rotation number of the drum during playback at the normal speed multiplied by N becomes $R(1+q/Q)$ rpm. Because it is assumed that such a portion of the signals reproduced by the rotary head during high-speed playback can be correctly restored by the error correction function that the amplitude of the reproduced signal is not less than 50% of the amplitude obtained during normal playback as in the case of the prior art also in this embodiment, cor. is set to 0.5. The value of cor. may also be changed by means of the tape running speed N. (For example, cor. may be changed as cor.=0.6 when N=2 and cor.=0.5 when N=6.)

The reason for the restriction by the governing equation for the rotation number of the drum when no fixed pattern appears during playback at the normal speed multiplied by N in this embodiment will be described below. Generally, when the rotation number of the drum of a VTR employing the segment recording method is increased by a rate of q/Q to $R \times (1+q/Q)$ (namely $R \times (Q+q)/Q$) rpm, the trace of scanning by the rotary head on tracks becomes identical with that of a case wherein the tape running speed is set to $(N \times Q/(Q+q))$ for the sake of convenience, here $(N \times Q)$ and $(Q+q)$ are relative primes. In case (NQ) and (Q+q) are not relative primes, (Q+q) divided by the least common multiple of the two numbers is denoted as (Q+q)' and the term (Q+q) in equation (2) is replaced by (Q+q)'. Thus when apparent tape running speed is used in equation (1), it follows that the trace of head scanning completes one cycle when the head has scanned $(Q+q) \times k$ (k is the least value satisfying equation (1)) times.

Consequently, the left-hand side of equation (2) represents the number of scans the head has made before the trace of scan makes one cycle for the unit of recording in the segment recording method. The right-hand side of equation (2), on the other hand, represents the total amount of data required to obtain data for one unit of recording in terms of the number of segments. This can be roughly described as follows in the case of this embodiment. When it is assumed that such a portion of the signals reproduced by the rotary head during high-speed playback can be correctly restored by the error correction function that the amplitude of the reproduced signal is not less than 50% of the amplitude obtained during normal playback as in the case of the prior art also in this embodiment, the right-hand side of the equation (2), S/0.5 (=2×S) is the least number of segments required to acquire one recording unit (that is, the number of head scans for two frames which is necessary to obtain reproduced signals over the entire screen of one frame). This means that, even if 50% of the reproduced signals cannot be restored in the period of reproducing the data of one frame, when the portion of 50% which has not be reproduced during the above period of playback is reproduced in a period of reproducing the next one frame (information is reproduced from track position different from the above period of playback), fixed pattern does not appear even when reproducing at the normal speed multiplied by N (N is an integer) because data of all positions on the screen are replaced every two frames. Therefore if the left-hand side of the equation (2), is greater or equal to the right-hand side for the least natural number k which satisfies the equation (1), different reproduced signals are obtained in every scan of the head which is in scanning of two frames, and therefore no fixed pattern appears even during playback at the normal speed multiplied by N (N is an integer), making it possible to obtain pictures reproduced at N times the speed with excellent picture quality.

A case of satisfying the equation (2) will be described below. A case wherein the rotation number of the drum is changed with a factor of 1/10 from R rpm to R(1+1/10) rpm during double-speed playback in the equation (2) will be described.

Now a case of double-speed playback wherein the rotation number of the drum is increased by a factor of 1/10 from the normal 4500 rpm to about 4950 rpm will be described below. In equation (2), N=2, Q=10 and q=1. In this embodiment too, because 2-channel recording is carried out and one frame is recorded in 10 tracks, number of segments is S=5. As described above, when these values are employed, the least value of k which satisfies equation (1) is 1. Thus the left-hand side of equation (2) becomes $(Q+q) \times k=11$ and the right-hand side is 10, satisfying the condition. That is, from the relation between the number of segments and the rate of data correctly restored by the error correction function, while it requires head scanning period corresponding to two frames, namely ten scans of the head to reproduce the data recorded at all positions of the track during double-speed playback, reproduced signals of different positions of the screen can be obtained at every one scan of the head because 11 scans of the head completes one cycle of the head scan trace, and therefore no fixed pattern appears even during double-speed playback.

A drawing explanatory of the relation between the track pattern and the trace of head scanning when the rotation number of the drum is increased by 10% over that of normal playback during double-speed playback, a drawing illustrative of the signals reproduced by the rotary head 8a during double-speed playback, and a drawing illustrative of the playback state of the track A1 are shown in FIG. 7 and FIG. 8 for the first embodiment, and will therefore be omitted here.

The above example is for the least value of k=1 which satisfies the equation (1), and the probability of data playback during high-speed playback is the highest and the reproduced information from all tracks is written over in a short period when k equals 1, and therefore one frame can be formed of frames nearer to each other in time, making it possible to obtain high-speed playback pictures having more natural quality.

As described above, although information recorded in the fixed position of a track is not reproduced at all resulting in a fixed pattern appearing in the reproduced picture when double-speed playback is carried out with the normal rotation number of the drum, the output pattern of the reproduced signals shifts a little by changing the rotation number of the drum to satisfy the equation (2) from the value of normal playback in a home digital VTR, thus reproduced information from all positions of each track can be obtained by synthesizing the reproduced information by using the memory even during double-speed playback.

Although details will be omitted, also in a case when combined with the normal speed multiplied by a non-integer (N+m/M), for the least value of k which satisfies the following equation $$(M \times N+m) \times Q \times k \equiv (\bmod\ S),$$

the tape running speed and the rotation number of the drum are determined so that the following inequality holds, and then there may be a case when no fixed pattern appears even during playback at the normal speed multiplied by (N+m/M).

$$|Q+q| \times k > S/cor. \qquad (2')$$

where $S: S \geq 2$ $Q$, $q$: Integers which satisfy the relation $|q|<|Q|$ $k$: Any natural number satisfying $k \leq S-1$ cor.: Data acquisition rate for data correctly obtained by error correction function during high-speed playback.

Although a case of increasing the rotation number of the drum by 1/10 times the rotation number of normal playback in double-speed playback is described in this embodiment, similar effect can be obtained with the normal speed multiplied by other integers or non-integer numbers, and other factors of changing the rotation number of the drum, if the equation (2) is satisfied.

Embodiment 4

Figure 3A:
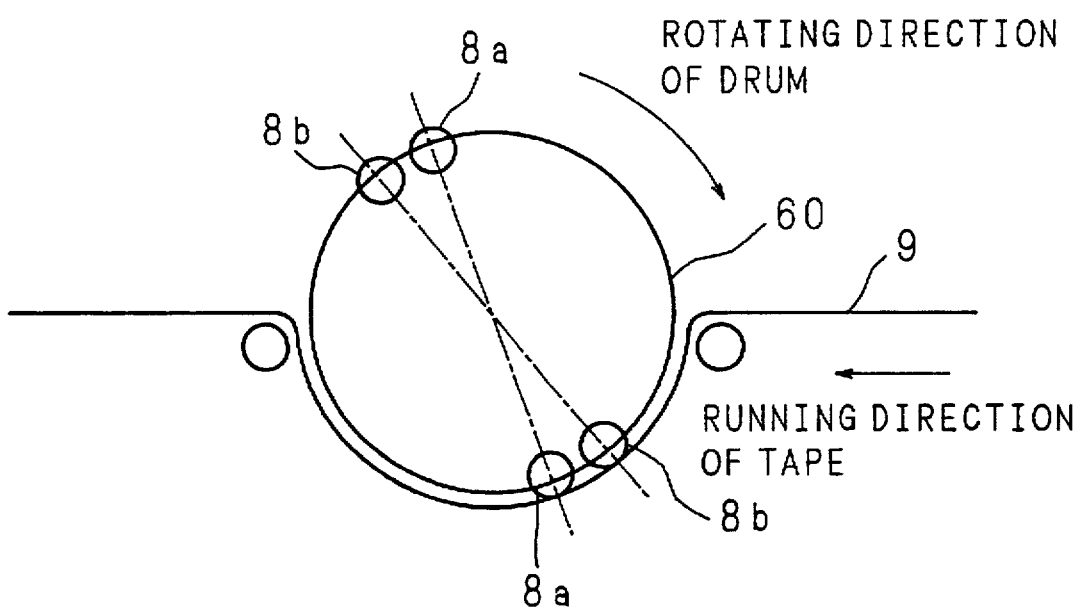
FIG. 3(a) is a drawing illustrative of the relative position of a magnetic tape and a drum when 2-channel opposing heads are employed as a rotary head in the magnetic recording and reproduction apparatus of the prior art.
Figure 3B:
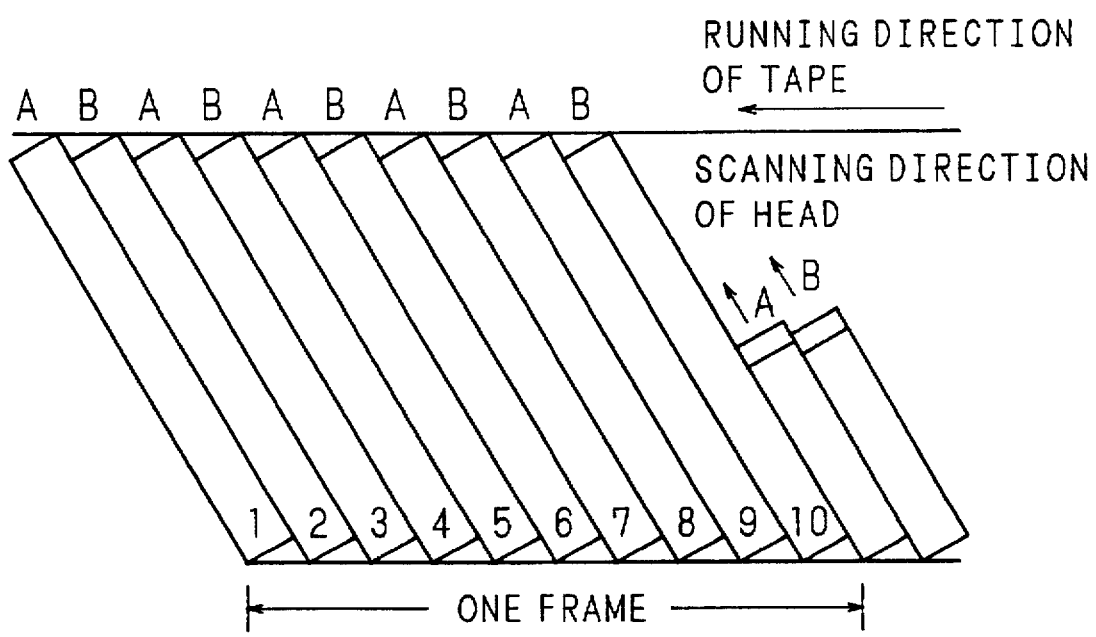
FIG. 3(b) is a drawing explanatory of a track pattern formed on a magnetic tape in the magnetic recording and reproduction apparatus of the prior art.
Figure 4A:
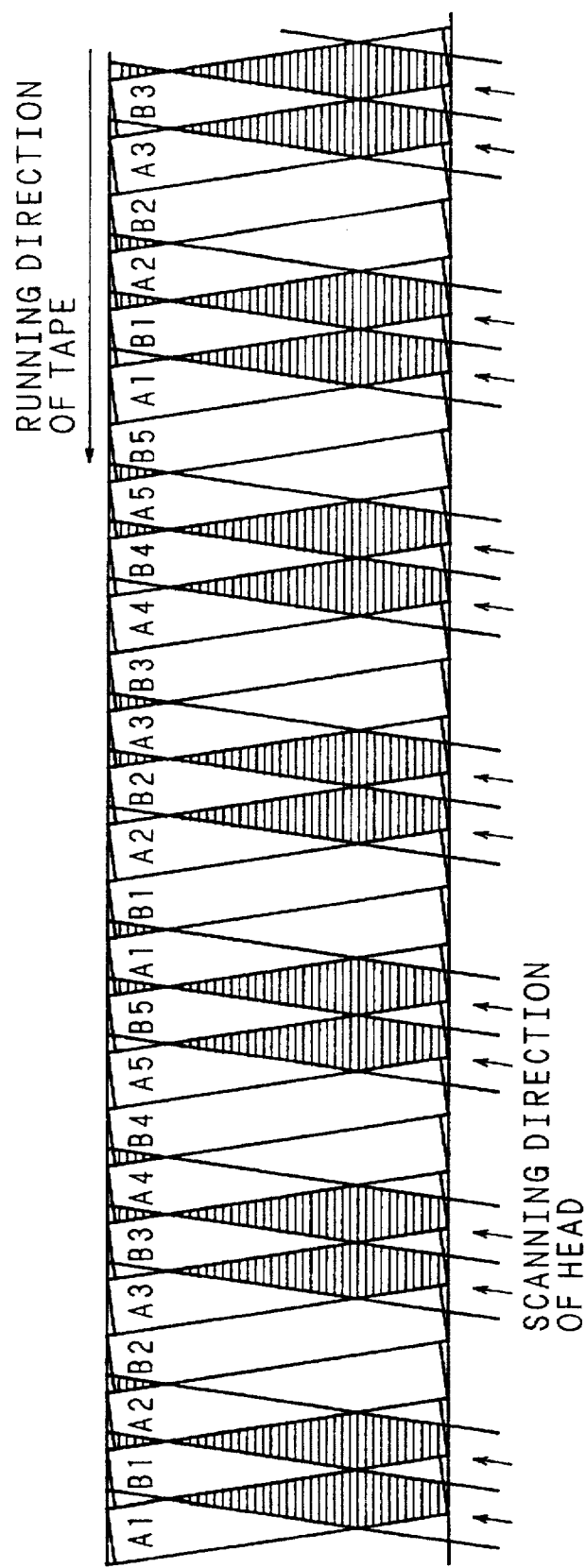
Figure 5A:
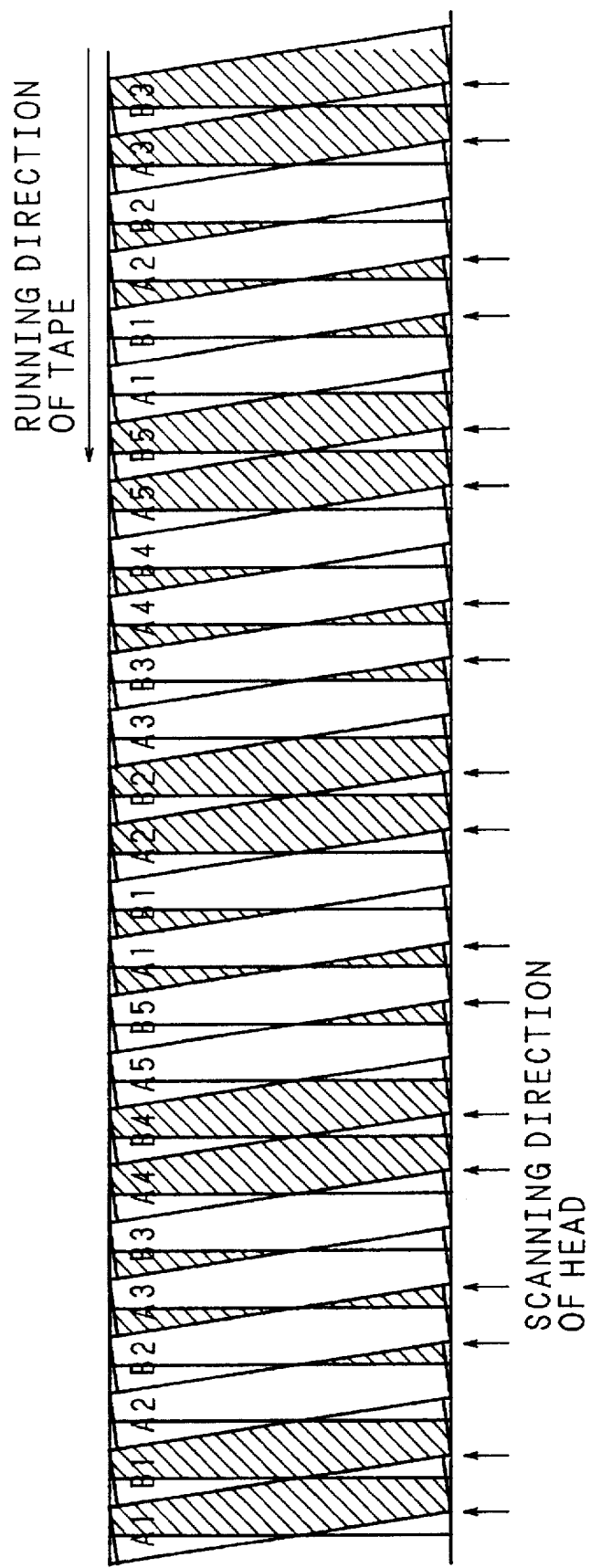

The fourth embodiment of the invention will now be described. In the embodiments 1 through 3 described above, the problem that data recorded at particular positions of the track is not reproduced at all so that a fixed pattern appears on the reproduced picture during double-speed playback (or playback at the normal multiplied by an integer N) is solved by changing the rotation number of the drum during high-speed playback by a specified factor from the rotation number of the drum of normal speed playback according to the equation (1) or (2). In this embodiment, the rotation number of the drum is changed by a specified factor as in embodiments 1 through 3 and such a problem is solved that, as the rotation number of the drum is changed, the relative speed of the rotary heads 8a, 8b and the magnetic tape 9 changes and the frequency bandwidth of the reproduced digital signals increases resulting in instability of the clock signal outputted from the data detection circuit during high-speed playback (instability in the operation of a phase locked loop circuit (PLL circuit)). In this embodiment too, 2-channel opposing heads are employed as shown in FIG. 3 and the rotation number of the drum during normal playback is set to 4500 rpm. Therefore one frame is recorded in ten tracks.

Figure 12:
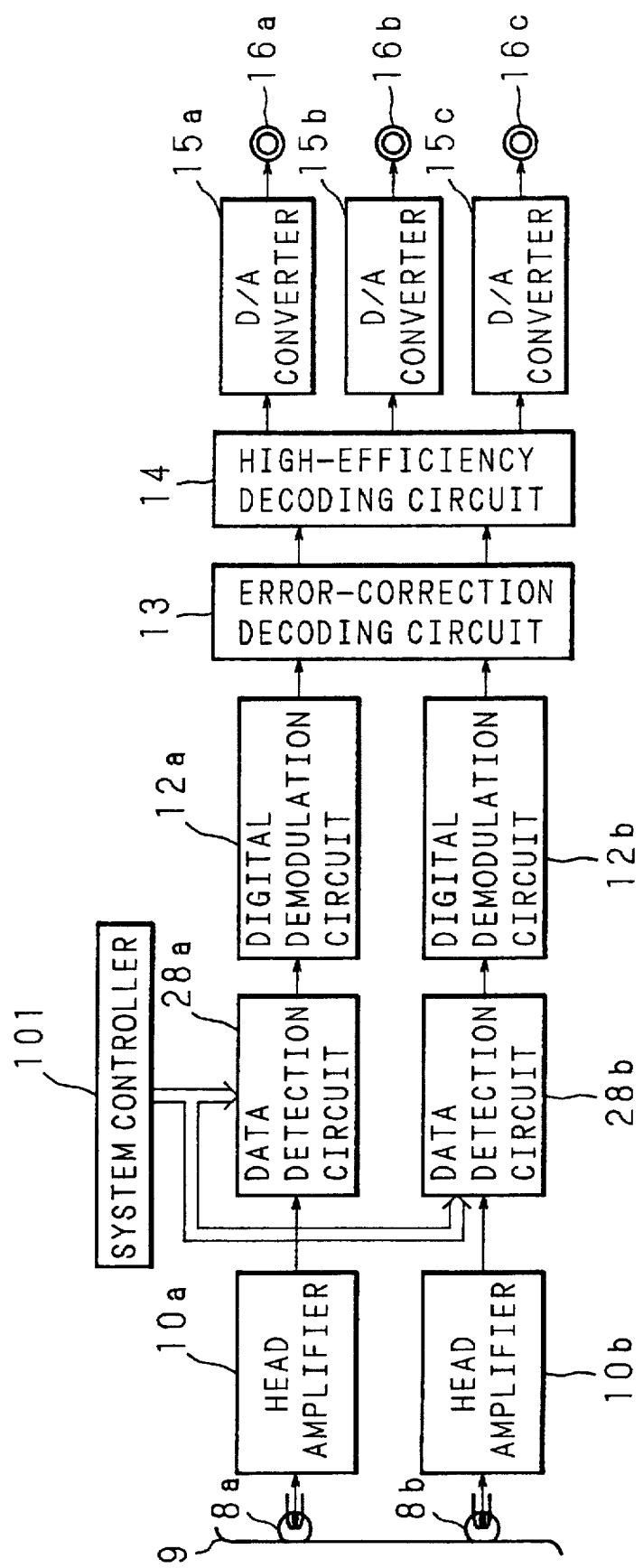
FIG. 12 is a block diagram of a playback section of the magnetic recording and reproduction apparatus of the fourth embodiment of the invention.

The block circuit of the playback section of the magnetic recording and reproduction apparatus in the fourth embodiment of the invention is shown in FIG. 12. Portions given the same numerals in FIG. 12 as those of FIG. 1 of the prior art are identical portions and the description thereof will be omitted. Numeral 101 denotes a system controller which outputs the mode signal according to the operation mode of the magnetic recording and reproduction apparatus. Numerals 28a, 28b denote a data detection circuit which detects data from the reproduced signals and detects jitter in the reproduced signals and corrects it. Details of the data detection circuits 28a, 28b will be described later. The constitution and operation of the high-efficiency decoding circuit 14 are also the same as those shown in FIG. 2, and the description thereof will be omitted.

The block diagram of the drum motor control section of the magnetic recording and reproduction apparatus in the fourth embodiment of the invention is the same as that of the first embodiment shown in FIG. 6 and the operation is also the same, therefore the description thereof will be omitted.

Let the maximum recording frequency (denoted as fmax) for the reproduced digital data when reproducing at the rotation number of the drum of the normal playback be 27 MHz. When the rotation number of the drum is increased from 4500 rpm to 4950 rpm with a factor of 1/10 during high-speed playback, fmax increases by about 10% from 27 MHz to 29.7 MHz.

Jitters contained in the reproduced signals during normal playback are generally within several percent, and clock signal generation is controlled so that a voltage-controlled oscillator (hereinafter called VCO) generates clock signals, preferably linearly, in an adjustable bandwidth of several percent around a central frequency (27 MHz in this embodiment). As the adjustable frequency bandwidth of the VCO increases, the phase of the clock signal becomes more sensitive to disturbances such as noise and becomes unstable, resulting in instability of the phase of the clock signals generated by the VCO in the data detection circuit, and satisfactory data cannot be obtained, when detecting data from the reproduced signals and applying time domain correction.

When the rotation number of the drum is increased by 10% over the normal rotation number as in this embodiment, peak frequency of the reproduced signals is about 29.7 MHz. To accommodate this peak frequency with the VCO having the central frequency at 27 MHz for the normal playback, the PLL circuit (VCO) must be controlled to lock the frequency within the adjustable bandwidth of at least 10% from 27 MHz. However, when the bandwidth is controlled in a range beyond 10%, the clock signal generated by the PLL circuit in the data detection circuit becomes unstable due to the noise and other causes as described above.

For the reason described above, this embodiment employs two or more VCOs with one VCO providing for the rotation number of the drum increased by 10% over the normal rotation number for high-speed playback (namely the basic frequency is set to 29.7 MHz), and another providing for the basic frequency of the normal playback. When reproducing at a high speed, the operation is switched to the VCO for the high-speed playback so that the variation of the frequency of the VCO is limited within several percent in each playback mode, thereby making it possible to supply stable clock signals generated by the data detection circuit.

Figure 13:
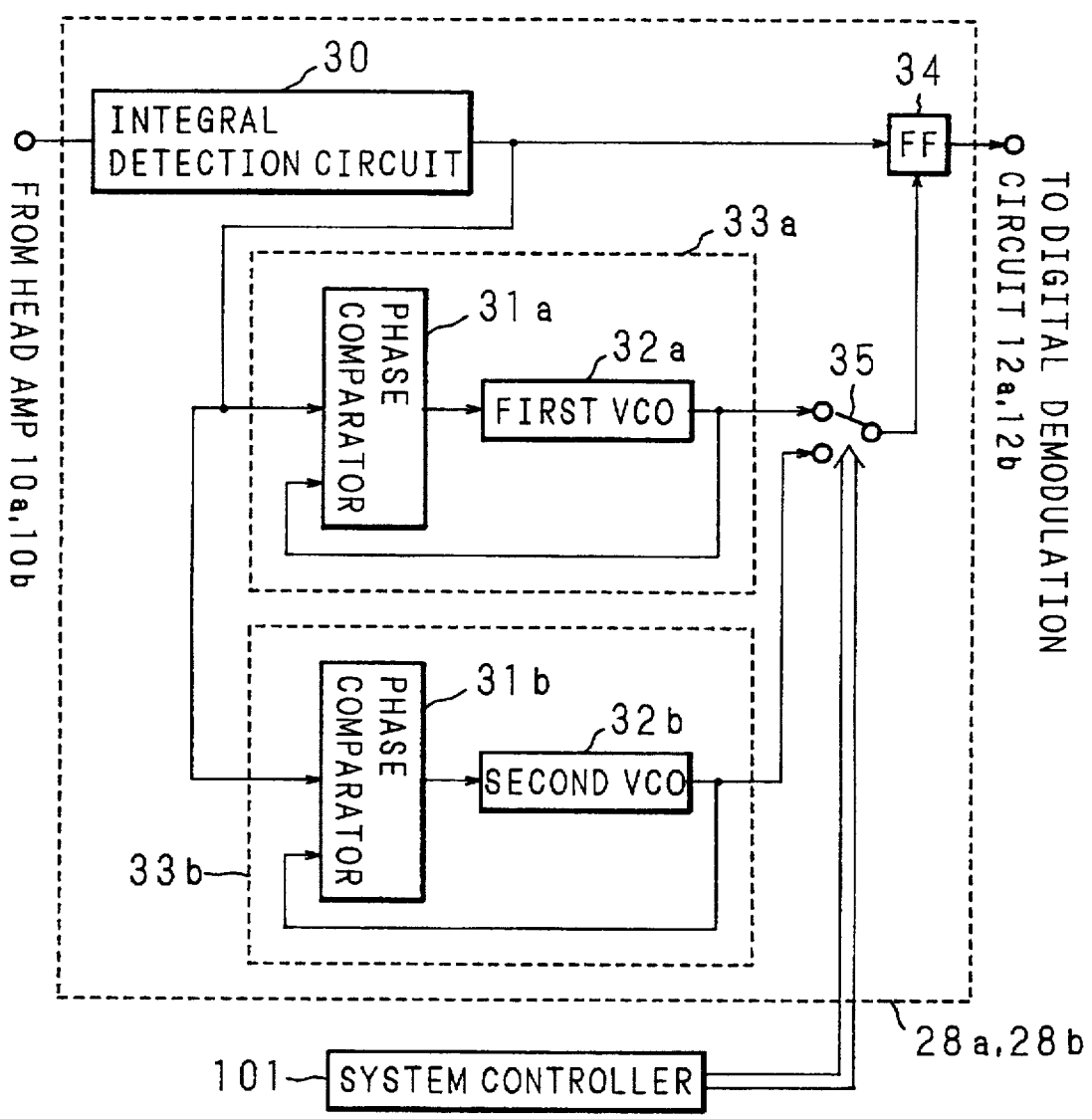
FIG. 13 is a block diagram of a data detection circuit installed in the magnetic recording and reproduction apparatus of the fourth embodiment of the invention.

FIG. 13 is a block diagram of the data detection circuit installed in the magnetic recording and reproduction apparatus of the fourth embodiment of the invention. In FIG. 13, numeral 30 denotes an integral detection circuit which integrates the reproduced signal outputted from the head amplifier 10. Numerals 31a, 31b denote phase comparators which compare the phases of the reproduced signal outputted from the integral detection circuit 30 and the playback clock signal. Numerals 32a, 32b denote a first VCO and a second VCO which oscillate in the frequency range for the normal playback and in the frequency range for the high-speed playback, respectively. Numeral 33a denotes a first PLL circuit having the phase comparator 31a and the first VCO 32a. Numeral 33b denotes a second PLL circuit having the phase comparator 31b and the second VCO 32b. Numeral 34 denotes a flip-flop circuit which latches the output of the integral detection circuit 30 according to the clock signals from the first PLL circuit 33a and the second PLL circuit 33b. Numeral 35 denotes a switch which switches between the outputs from the first PLL circuit 33a and the second PLL circuit 33b according to the mode signal outputted from the system controller 101.

The operation of the data detection circuits 28a, 28b during normal playback will now be described below with reference to FIG. 13. The reproduced signals are amplified by the head amplifiers 10a, 10b and, when reproduced data is detected by the integral detection circuit 30, the first PLL circuit 33a is selected according to the normal playback mode signal outputted from the system controller 101 and playback clock signals are generated by the first VCO 32a which is an oscillator tuned for the basic frequency of the normal playback. The phase comparator 31a compares the phases of the reproduced data detected by the integral detection circuit 30 and the playback clock signal outputted from the first VCO 32a. Based on the result of phase comparison in the phase comparator 31a, the first VCO 32a outputs the clock signals of the frequency tuned to the jitter which is included in the reproduced signals. The output from the integral detection circuit 30 is latched in the flip-flop circuit 34 by the clock signal outputted from the first PLL circuit 33a, and is outputted to the digital demodulation circuits 12a, 12b.

The operations of the data detection circuits 28a, 28b during double-speed playback will now be described below with reference to FIG. 13. The reproduced signals are amplified by the head amplifiers 10a, 10b and, when reproduced data is detected by the integral detection circuit 30, the second PLL circuit 33b is selected according to the double-speed playback mode signal outputted from the system controller 101 and playback clock signals are generated by the second VCO 32b which is an oscillator tuned for the basic frequency of the double-speed playback. The phase comparator 31b compares the phases of the reproduced data detected by the integral detection circuit 30 and the playback clock signal outputted from the second VCO 32b. Based on the result of phase comparison in the phase comparator 31b, the second VCO 32b outputs the clock signals of the frequency tuned to the jitter which is included in the reproduced signals. The output from the integral detection circuit 30 is latched in the flip-flop circuit 34 by the clock signal outputted from the second PLL circuit 33b, and is outputted to the digital demodulation circuits 12a, 12b.

In this embodiment wherein at least two VCOs are provided as described above, to change the rotation number of the drum by 10% from the normal rotation number of the drum during high-speed playback, one VCO sets the basic frequency for the high-speed playback 10% higher than that of normal playback with the two VCOs being used by switching them depending on whether the playback is done at the normal speed or at a high speed. Thus even when the peak recording frequency changes at a position higher than that of normal playback due to the increased rotation number of the drum during high-speed playback, clock signals of stable frequency can be obtained to make it possible to lock the generated clock signals within a suitable range in the data detection circuit.

Although this embodiment is described for a case of increasing the rotation number of the drum by 10% during high-speed playback, the rate of changing the rotation number of the drum may be other value within a range adjustable with the mechanism (the rotation number of the drum may also be decreased from the normal rotation number), provided that the basic frequency of the second VCO 32b is to be changed according to the rate of changing the rotation number of the drum.

Although this embodiment is described for a case of double-speed playback, the same effect can be obtained with the normal speed multiplied by another number. The same effect can also be obtained with a tape running speed which is the normal speed multiplied by a non-integer number.

Embodiment 5

The fifth embodiment of the invention will now be described. In the embodiments 1 through 4 described above, the problem that data recorded at particular positions of the track is not reproduced at all so that a fixed pattern appears on the reproduced picture during double-speed playback (or playback at the normal speed multiplied by an integer N) is solved by changing the rotation number of the drum a little from the rotation number of the drum of normal playback during high-speed playback. In this embodiment, the rotation number of the drum is controlled to prevent the fixed pattern observed during playback at the normal speed multiplied by an integer from appearing.

The block diagram of the playback section of the magnetic recording and reproduction apparatus in the fifth embodiment of the invention is the same as that of the prior art as in the case of the first embodiment, and the operation thereof is also the same and the description thereof will be omitted. The high-efficiency decoding circuit 14 is identical with that shown in FIG. 2 and the operation is also the same, and the description thereof will be omitted.

Figure 14:
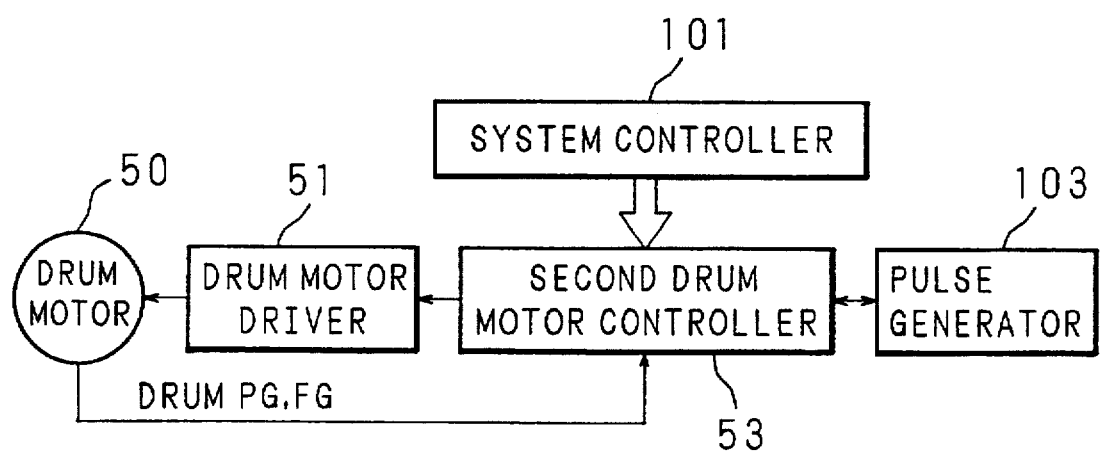
FIG. 14 is a block diagram of a drum motor controller installed in the magnetic recording and reproduction apparatus of a fifth embodiment of the invention.

FIG. 14 is the block diagram of the drum motor control section of the magnetic recording and reproduction apparatus in the fifth embodiment of the invention. In FIG. 14, numeral 101 denotes the system controller which outputs the mode signal according to the operation mode of the magnetic recording and reproduction apparatus. Numeral 50 denotes a drum motor. Numeral 51 denotes a drum motor driver for generating the voltage for driving the drum motor 50. Numeral 103 denotes a pulse generator for generating control signals to control the rotation number of the drum. Numeral 53 denotes a second drum motor controller which controls the revolution of the drum motor 50 according to the mode signal corresponding to the mode signal outputted from the system controller 101, control signal generated by the pulse generator 103 and the drum PG and drum FG signals outputted from the drum motor 50. The constitution and the operation of the capstan motor controller are the same as those of the first embodiment and therefore the description thereof the will be omitted.

The operation of the control section for the drum motor 50 during normal operation will now be described with reference to FIG. 14. In the normal playback, when the normal playback mode signal is outputted from the system controller 101, the second drum motor controller 53 controls the rotation of the drum motor 50 by using the normal playback mode signal and the drum PG and drum FG signals outputted from the drum motor 50. The drum motor driver 51 generates drive voltage for driving the drum motor 50 according to the control signal outputted from the second drum motor controller 53.

The operation of the drum motor control section during double-speed playback will now be described with reference to FIG. 14. When the double-speed playback mode signal is outputted from the system controller 101, the second drum motor controller 53 generates control signal which controls the rotation number of the drum according to the double-speed playback mode signal which has been outputted. Details of the method of controlling the rotation number of the drum during double-speed playback will be described later. The drum motor driver 51 feeds the drum motor 50 with drive voltage according to the input signal to drive the drum motor 50. Phase control is not carried out in this process.

The operation of the fifth embodiment of the invention will be described with reference to FIG. 16. A case of double-speed searching by means of the drum rotation number controller of this embodiment in a digital VTR equipped with the 2-channel opposing heads shown in FIG. 3 will be described. FIG. 16(b) shows the waveform of the values of the drum rotation number data outputted from the second drum motor controller 53 of this embodiment during double-speed playback. The rotation number is subjected to sinusoidal changes with amplitude a around the normal rotation number of the drum as the center, and the average of the rotation numbers of the drum is the rotation number of the drum of the normal playback. Let the normal rotation number of the drum be R rpm, then the rotation number is given by equation (3).

$$R(1+a \sin \omega t) \qquad (3)$$

where t represents time, while ω and a are real numbers. In this embodiment, the rotation number of the drum during playback at the normal speed multiplied by N is changed periodically as a function of time.

As described, this embodiment is to change the rotation number of the drum periodically (ω) around the rotation number of the drum at the center during normal playback with a specified amplitude a. The embodiments 1 through 4, on the other hand, are to change the rotation number of the drum to specified values. For example, when the rotation number of the drum is increased by 10%, the rotary head scans 1.1 tracks in a period of time during which one track is scanned at the normal rotation number of the drum. This means that the time required by the rotary head to scan one track is shortened to 1/1.1 times that of a case when the normal rotation number of the drum is employed. Thus because increasing the rotation number of the drum to a specified value causes the processing time for playback of one track to be shortened, time available in the playback section to decode the data by the error correction decoding circuit 13 and the high-efficiency decoding circuit 14 decreases resulting in a possibility that satisfactory reproduced signal processing cannot be done. When the rotation number of the drum is decreased to a specified value, on the other hand, because the processing time for playback of one track is elongated conversely to the case of increasing the rotation number of the drum, time available to decode the data increases although decreasing the rotation number of the drum causes the efficiency of data playback also to decrease, and causes the rate of writing over the information stored in the memory within the period of one field or one frame to decrease, resulting in somewhat unnatural movement of the multispeed playback pictures.

As described above, although the problem that data recorded at particular positions of the track is not reproduced at all so that a fixed pattern appears on the reproduced picture during double-speed playback (or playback at the normal speed multiplied by an integer N) is solved in the embodiments 1 through 4 by changing the rotation number of the drum from the rotation number of the drum of normal playback to a specified value, the processing time of decoding is always shortened and therefore there may happen a case where satisfactory decoding process cannot be carried out.

In this embodiment, the rotation number of the drum is changed periodically with a certain amplitude around the rotation number of the drum of the normal playback as the center, and the rotation numbers of the drum during high-speed playback are controlled so that the average thereof equals the rotation number of the drum during normal playback. Thus the problem that data recorded at particular positions of the track is not reproduced at all so that a fixed pattern appears on the reproduced picture during double-speed playback (or playback at the normal speed multiplied by an integer N) is solved by periodically changing the rotation number of the drum during high-speed playback with a certain amplitude around the rotation number of the drum of normal playback, and the trace of the rotary head scanning is also periodically shifted a little. This also makes the processing time of decoding approximately equal to that of high-speed playback with the rotation number of the drum during normal playback when the average of the changing rotation numbers of the drum over one period is taken for the decoding time. Thus satisfactory decoding process can be carried out.

As described above, the relative position between the trace of head scanning and the magnetic tape 9 when the rotation number of the drive motor 50 is set becomes as shown in FIG. 16(a). The trace of scanning indicated by dashed line in FIG. 16(a) represents the trace of scanning by the rotary head when the rotation number of the drum motor 50 is fixed at that of normal playback. When the rotation number of the drum motor 50 is changed in a sinusoidal waveform with amplitude a around the normal rotation number of the drum as shown in FIG. 16(b), the trace of scanning by the rotary head on the recording track becomes as indicated by the curve shown in FIG. 16(a) in correspondence to the rotation number of the drum motor 50. Because the rotary heads have azimuth angles different from each other, signals corresponding to the shaded portion in the drawing represent the information reproduced by the rotary heads 8a, 8b of the respective channels. FIG. 16(c) shows the signals reproduced by the rotary head 8a during double-speed playback, with time being plotted along the abscissa and the amplitude of the reproduced signal outputted from the rotary head 8a during high-speed playback being plotted along the ordinate. In the description that follows, it is assumed that such a portion of the signals reproduced by the rotary head 8a can be correctly restored by the error correction function that the amplitude of the reproduced signal is not less than 50% of the amplitude obtained during normal playback.

FIG. 16(d) shows the playback state of the track A1 synthesized by using the memory according to the playback output chart shown in FIG. 16(c). Data recorded at the bottom of the track A1 to the data recorded at the top of the track A1 are successively placed in the drawing starting at the leftmost position. Amplitudes of the reproduced signals are plotted along the ordinate. As shown in FIG. 16 (d), data recorded at all positions of the track A1 is restored. Data recorded at all positions of the track can be obtained also from the other nine tracks, though details will be omitted.

As described above, although information recorded in the fixed position of a track is not reproduced at all resulting in a fixed pattern appearing in the reproduced picture when double-speed playback is carried out with the normal rotation number of the drum by changing the rotation number of the drum periodically with a certain amplitude around the rotation number of the drum of the normal playback as the center in a home digital VTR, the reproduced track pattern is shifted a little periodically in this embodiment, thus reproduced information from all positions of each track can be obtained by synthesizing the reproduced information by using the memory even during double-speed playback. Also because the rotation number of the drum is periodically changed around the rotation number of the drum of the normal playback, reduction of the decoding processing time of the reproduced information in every track does not accumulate and the average of the decoding processing time becomes near the decoding processing time of the normal playback, making it possible to carry out satisfactory decoding processing.

The operation of the second drum motor controller 53 of the drum motor controller shown in FIG. 14 will now be described below with reference to FIG. 15. In this embodiment, the 2-channel opposing heads shown in FIG. 3 are employed and the rotation number of the drum is set to 4500 rpm. That is, one track is scanned in a half turn of the drum. The rotation number of the drum is controlled so that the number of FG pulses agrees with the set number during normal playback according to the drum PG and drum FG signals, and the rotation number of the drum is maintained at 4500 rpm. That is, if the number of FG pulses generated in one turn of the drum is L, (75×L) pulses are inputted in one second because the drum is controlled to rotate at a fixed speed of 4500 rpm in the normal playback. On the other hand, because the frame frequency is 30 Hz, the rotation number of the drum can be fixed at 4500 rpm if the drum motor is controlled so that ((75×L)/30) pieces of FG pulses are inputted in one frame period. If the drum motor is controlled so that the number of FG pulses which are fed in one frame period is L', it follows that the drum is substantially controlled to rotate at a speed L'/L times the normal speed. Therefore if the value of L' is made to change with L×(1+a sin ωt), then the drum rotates at the normal rotation number multiplied by L'/L, namely (1+a sin ωt) times the normal rotation number. Thus the rotary head is made to scan over the track on the magnetic tape 9 as shown in FIG. 16(a) by selecting the values of a, ω to control the drum motor.

FIG. 15(a) shows the number of FG pulses generated in one frame period during normal rotation. FIG. 15(b) shows the number of FG pulses generated in one frame period when the rotation number of the drum during double-speed playback is changed periodically with a function of time. FIG. 15(c) schematically shows the change of the number of FG pulses within one frame period during double-speed playback according to FIG. 15(b). FIG. 15(d) shows the relation between the rotation number of the drum and time due to the change of the number of FG pulses during double-speed playback according to FIG. 15(c). In this embodiment, sine wave is used as the function of time. The second drum motor controller 53 changes the number of FG pulses in sinusoidal waveform with an amplitude a around the normal rotation number of the drum as the center according to the double-speed playback mode signal. The drum motor driver 51 generates drive voltage so that the drum motor 50 makes a half turn (or one turn) in the period of time corresponding to the change in the number of rotation pulses which is set by the second drum motor controller 53. By controlling the rotation number of the drum as described above, the rotary head is made to scan over the track on the magnetic tape 9 as shown in FIG. 16(a).

As described above, the problem that data recorded at particular positions of the track is not reproduced at all during double-speed playback is solved by using the drum motor controller installed in the magnetic recording and reproduction apparatus of this embodiment. Consequently, it is made possible to solve the problem, that a fixed pattern appears on the reproduced picture in a magnetic recording and reproduction apparatus which carries out reproduced signal processing by using image memory, can be solved to obtain good double-speed playback pictures. Moreover, because the rotation number of the drum is periodically changed around the rotation number of the drum of the normal playback, reduction of the decoding processing time of the reproduced information in every track does not accumulate and the average of the decoding processing time becomes approximately equal to the decoding processing time of the normal playback, making it possible to carry out satisfactory decoding processing possible.

Although the rotation number of the drum is periodically changed with an amplitude around the rotation number of the drum of normal playback as the center in this embodiment, the center of the changing of the rotation numbers of the drum may be made higher than that of normal playback so that the rotation number of the drum changes around the center of the rotation number of the drum which is higher than that of normal playback, if sufficient decoding time is available. The rotation number of the drum may also be changed around a rotation number of the drum lower than that of normal playback as the center.

Although this embodiment is described for a case of double-speed playback, the same effect can be obtained with the normal speed multiplied by another integer. The same effect can also be obtained with a tape running speed which is the normal speed multiplied by a non-integer number.

Embodiment 6

The sixth embodiment of the invention will now be described. In the fifth embodiment described above, the problem that data recorded at particular positions of the track is not reproduced at all during double-speed playback (or playback at the normal speed multiplied by an integer N) is solved by periodically changing the rotation number of the drum with a certain amplitude around the rotation number of the drum of normal playback in the second drum motor controller 53. In this embodiment, a method for control different from that of the fifth embodiment will be described.

Figure 1:
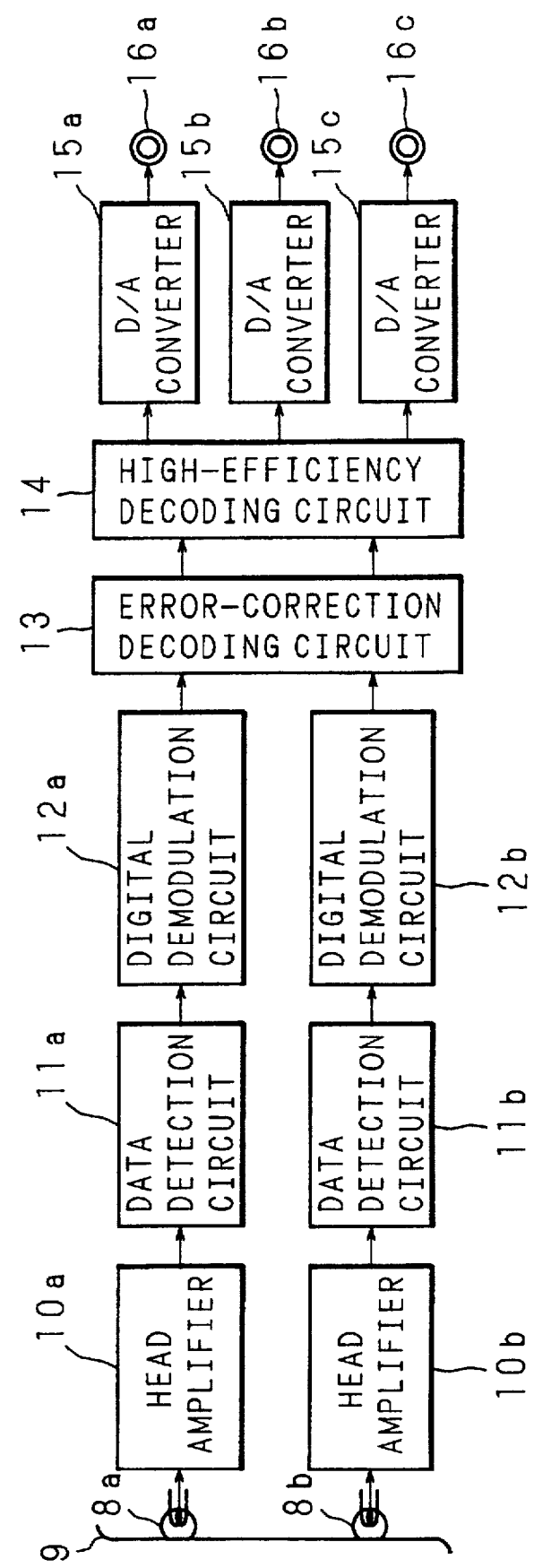
FIG. 1 is a block circuit diagram of the playback section of a magnetic recording and reproduction apparatus of a prior art.
Figure 2:
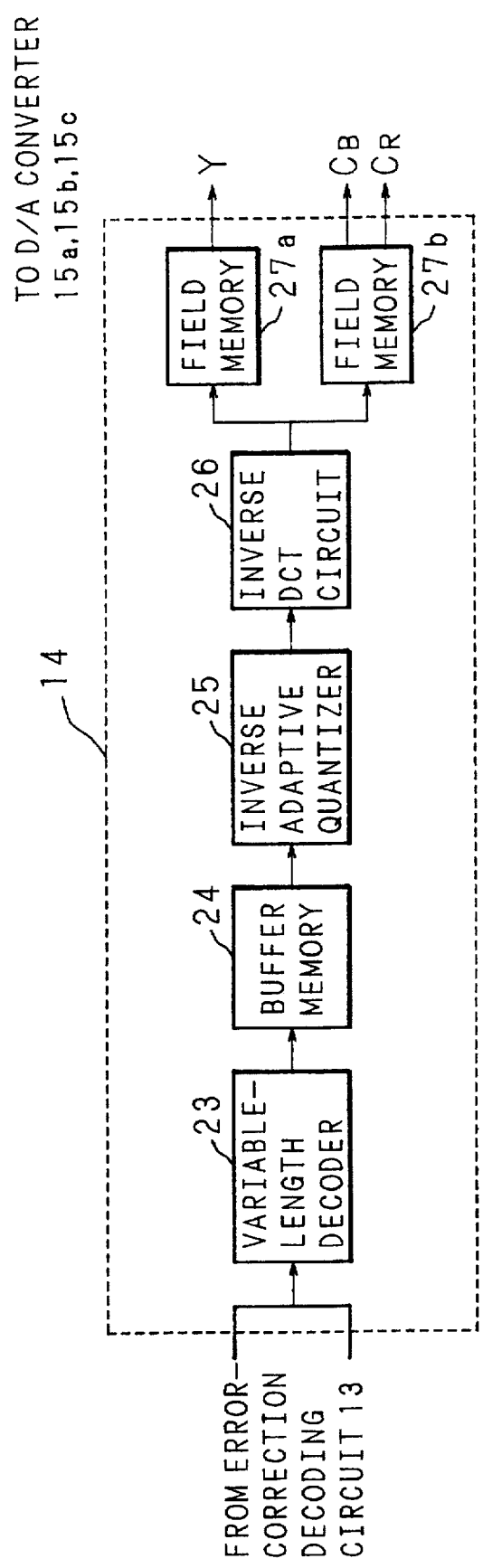
FIG. 2 is a block circuit diagram of a high-efficiency decoding circuit installed in the magnetic recording and reproduction apparatus of the prior art.

A block diagram of the playback section of the magnetic recording and reproduction apparatus in the sixth embodiment of the invention is the same as that of the prior art as in the case of the first embodiment shown in FIG. 1, and the operation thereof is also the same, and therefore the description thereof will be omitted. The high-efficiency decoding circuit 14 is identical with that shown in FIG. 2 and the operation is also the same, and the description thereof will be omitted.

Figure 17:
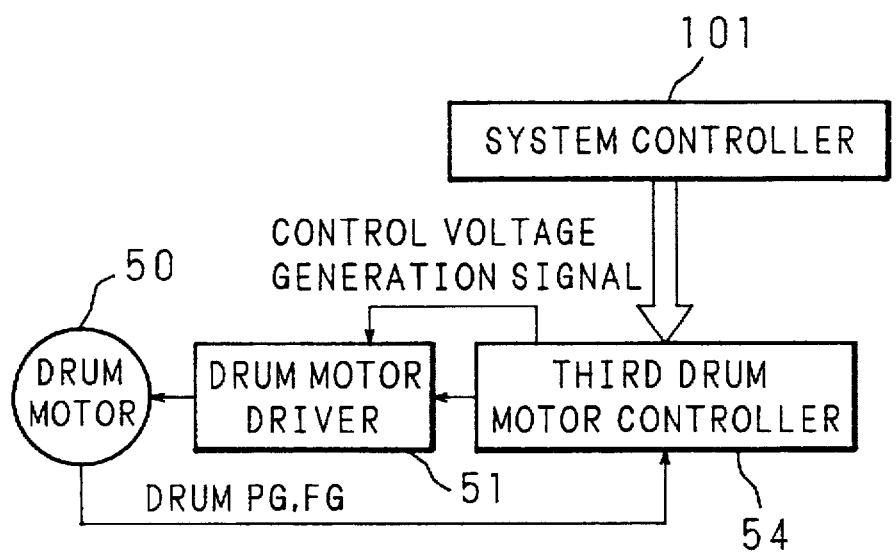
FIG. 17 is a block circuit diagram of the drum motor controller installed in the magnetic recording and reproduction apparatus of the sixth embodiment of the invention.

FIG. 17 is the block diagram of the drum motor control section of the magnetic recording and reproduction apparatus in the sixth embodiment of the invention. In FIG. 17, numeral 101 denotes the system controller which outputs the mode signal according to the operation mode of the magnetic recording and reproduction apparatus. Numeral 50 denotes the drum motor. Numeral 51 denotes the drum motor driver which generates the voltage for driving the drum motor 50. Numeral 54 denotes a third drum motor controller which outputs the control signal to set the level of voltage generated by the drum motor driver 51 according to the mode signal outputted from the system controller 101 and controls the rotation of the drum motor 50. The constitution and the operation of the capstan motor control section are the same as those of the first embodiment and therefore the description thereof will be omitted.

The operation of the control section for the drum motor 50 during normal playback will now be described with reference to FIG. 17. In the normal playback, when the normal playback mode signal is outputted from the system controller 101, the third drum motor controller 54 controls the rotation of the drum motor 50 under normal playback by using the normal playback mode signal and the drum PG and drum FG signals outputted from the drum motor 50. The drum motor driver 51 generates drive voltage for driving the drum motor 50 according to the control signal outputted from the third drum motor controller 54.

The operation of the drum motor control system during double-speed playback will now be described with reference to FIG. 17. When the double-speed playback mode signal is outputted from the system controller 101, the third drum motor controller 54 generates control signal which controls the rotation number of the drum according to the double-speed playback mode signal which has been outputted. The drum motor driver 51 feeds the drum motor 50 with drive voltage according to the control signal which has been inputted thereby to drive the drum motor 50.

The operation of the sixth embodiment of the invention will be described with reference to FIG. 18. A case of double-speed searching by means of the drum rotation number controller of this embodiment in a digital VTR equipped with the 2-channel opposing heads shown in FIG. 3 will be described. FIG. 18(a) shows the control signal generated by the third drum motor controller 54 to control the drive voltage for the driving the drum motor 50 rotation generated by the drum motor driver 51 during double-speed playback. The control signals are generated at specified intervals asynchronously with the phase of head scanning. In accordance with the control signals generated by the third drum motor controller 54 at specified intervals, the drum motor driver 51 generates drive voltage which alternately changes at specified intervals to drive the drive motor 50. FIG. 18(b) shows the change of the drum motor drive voltage actually generated by the drum motor driver 51 according to the control signals. When the drive voltage increases from Vmin to Vmax according to the control signal, it does not increase straight to Vmax but follows the curve shown in FIG. 18(b) to reach Vmax. When the drive voltage decreases from Vmax to Vmin according to the control signal, too, it does not decrease straight to Vmin but follows the curve shown in FIG. 18(b) to reach Vmin. FIG. 18(c) shows the change in the rotation number of the drum motor 50 which changes according to the drum motor drive voltage generated by the drum motor driver 51. It changes with an amplitude a around the normal rotation number of the drum 4500 rpm at the center as shown in FIG. 18(c). Because the rate of change of the drum motor drive voltage is nearly equal when increasing and decreasing, the average rotation number of the drum equals the normal rotation number of the drum. This embodiment is to change the rotation number of the drum during double-speed playback so that the average rotation number of the drum becomes approximately the rotation number of the drum during normal playback, by using the control signals asynchronous with the head scanning phase to increase and decrease the drive voltage for the drum motor 50 at a specified rate.

The relative position of the trace of head scanning and the magnetic tape, when the rotation number of the drum motor 50 is set as described above, is as shown in FIG. 19(a). While the trace of scanning indicated by dashed line in FIG. 19(a) represents the trace of scanning by the rotary head when the rotation number of the drum motor 50 is fixed, the trace of scanning by the rotary head when the rotation number of the drum motor 50 is changed so that the average rotation number becomes the rotation number of the drum during normal playback as shown in FIG. 18(c) becomes as indicated by the curve in FIG. 19(a) according to the rotation number of the drum. Because the rotary heads have azimuth angles different from each other, signals corresponding to the shaded portion in the drawing represent the information reproduced by the rotary heads 8a, 8b of the respective channels. FIG. 19(b) shows the signals reproduced by the rotary head 8a during double-speed playback, with time being plotted along the abscissa and the amplitude of the reproduced signal outputted from the rotary head 8a during high-speed playback being plotted along the ordinate. In the description that follows, it is assumed that such a portion of the signals reproduced by the rotary head 8a can be correctly restored by the error correction function that the amplitude of the reproduced signal is not less than 50% of the amplitude obtained during normal playback.

FIG. 19(c) shows the playback state of the track A1 synthesized by using the memory according to the playback output chart shown in FIG. 19(b). The data recorded at the bottom of the track A1 to the data recorded at the top of the track A1 are successively placed in the drawing starting at the leftmost position. Amplitudes of the reproduced signals are plotted along the ordinate. As shown in FIG. 19(c), data recorded at all positions of the track A1 is restored. Data recorded at all positions of the track can be obtained also from the other nine tracks, though details will be omitted.

As described above, although information recorded in the fixed position of a track is not reproduced at all resulting in a fixed pattern appearing in the reproduced picture when double-speed playback is carried out with the normal rotation number of the drum in a home digital VTR, the reproduced track pattern is shifted a little when the rotation number of the drum is changed with a certain amplitude around the rotation number of the drum of the normal playback in this embodiment, thus reproduced information from all positions of each track can be obtained by synthesizing the reproduced information by using the memory even during double-speed playback.

The problem of decrease in the decoding processing capability due to the reduction of the decoding processing time is not experienced in this embodiment as in the case of the fifth embodiment, though details will not be described here, because the arrangement of setting the center of the changes of the rotation number of the drum at the rotation number of the drum during normal playback has been described in the fifth embodiment.

As described above, the problem that data recorded at particular positions of the track is not reproduced at all in double-speed playback mode is solved by using the drum motor controller installed in the magnetic recording and reproduction apparatus of this embodiment. Consequently, it is made possible to solve the problem that a fixed pattern appears on the reproduced picture in the magnetic recording and reproduction apparatus which carries out reproduced signal processing by using image memory thereby to obtain good double-speed playback pictures.

Although the rotation number of the drum is periodically changed with an amplitude around the rotation number of the drum of normal playback at the center in this embodiment, the center of the changing rotation numbers of the drum may be made higher than that of normal playback so that the rotation number of the drum changes around the center of the rotation number of the drum which is higher than that of normal playback, if sufficient decoding time is available. The rotation number of the drum may also be changed around a rotation number of the drum which is lower than that of normal playback.

Although this embodiment is described for a case of double-speed playback, the same effect can be obtained with a tape running speed which is the normal speed multiplied by another integer or by a non-integer number. Control of the rotation number of the drum generally takes longer time when decreasing the speed than when increasing. Therefore, it may be controlled in such a manner as accelerating when the rotation number of the drum falls below a level and decelerating when it becomes higher than a certain level, while sensing the rotation number of the drum.

Embodiment 7

The seventh embodiment of the invention will now be described. This embodiment is also to make it possible to reproduce information recorded at all positions of tracks during playback at the playback speed multiplied by an integer N, by periodically changing the rotation number of the drum similarly to the fifth and sixth embodiments. The method of controlling the rotation number of the drum in this embodiment will be described below.

Block diagram of the playback section of the magnetic recording and reproduction apparatus in the seventh embodiment of the invention is the same as that of the prior art as in the case of the first embodiment shown in FIG. 1, and the operation thereof is also the same and the description thereof will be omitted. The high-efficiency decoding circuit 14 is identical with that shown in FIG. 2 and the operation is also the same, and the description thereof will be omitted.

Figure 20:
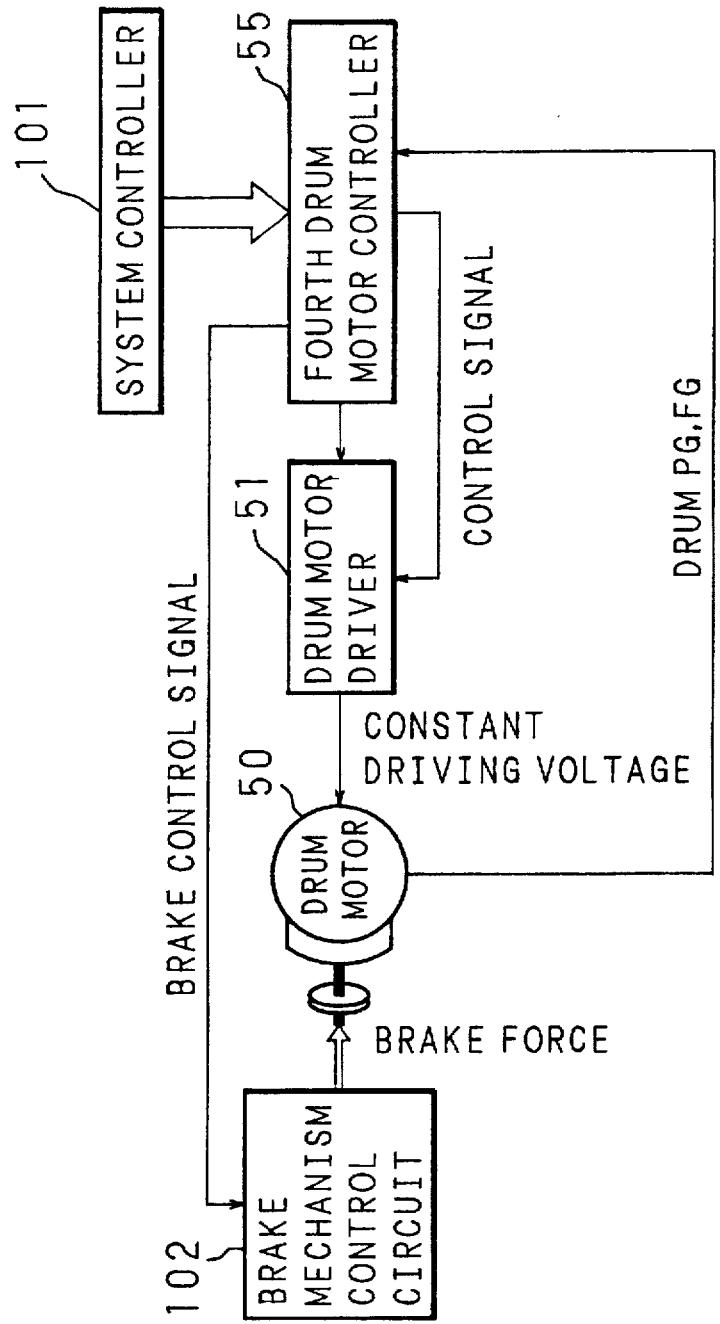
FIG. 20 is a block diagram of the drum motor controller installed in the magnetic recording and reproduction apparatus of the seventh embodiment of the invention.

FIG. 20 is the block diagram of the drum motor controller installed in the magnetic recording and reproduction apparatus of the seventh embodiment of the invention. In FIG. 20, numeral 101 denotes the system controller which outputs the mode signal according to the operation mode of the magnetic recording and reproduction apparatus. Numeral 50 denotes the drum motor. Numeral 51 denotes the drum motor driver which generates the voltage for driving the drum motor 50. Numeral 55 denotes a fourth drum motor controller which outputs the control signal to set the level of voltage generated by the drum motor driver 51 according to the mode signal outputted from the system controller 101 and controls the rotation of the drum motor 50. Numeral 102 denotes a brake mechanism controller which controls the rotation of the drum motor 50 by applying braking force to it according to the control signal outputted from the fourth drum motor controller 55 during high-speed playback. The constitution and the operation of the capstan motor control section are the same as those of the first embodiment and therefore the description thereof will be omitted.

The operation of the control system for the drum motor 50 during normal playback will now be described with reference to FIG. 20. In the normal playback, when the normal playback mode signal is outputted from the system controller 101, the fourth drum motor controller 55 controls the rotation of the drum motor 50 by using the normal playback mode signal and the drum PG and drum FG signals outputted from the drum motor 50. The drum motor driver 51 generates drive voltage for driving the drum motor 50 according to the control signal outputted from the fourth drum motor controller 55.

The operation of the drum motor control section during double-speed playback will now be described with reference to FIG. 20. When the double-speed playback mode signal is outputted from the system controller 101, the fourth drum motor controller 55 controls the rotation of the drum motor 50 by feeding the drum motor 50 with a drive voltage corresponding to the double-speed playback mode signal which has been outputted. On the other hand, the brake mechanism control circuit 102 generates braking force to decrease the rotation number of the drum motor 50 according to the brake control signal outputted from the fourth drum motor controller 55 throughout the period when the braking signal is generated, thereby controlling the rotation number of the drum motor 50.

The operation of the seventh embodiment of the invention will be described with reference to FIG. 21. A case of double-speed searching by means of the drum rotation number controller of this embodiment in a digital VTR equipped with the 2-channel opposing heads shown in FIG. 3 will be described. FIG. 21(a) shows the drive voltage generated by the fourth drum motor controller 55 of this embodiment to drive the rotation of the drum motor 50 during double-speed playback. The drive voltage is kept always constant at the drive voltage level of special playback which is higher than the level for normal playback as shown in the drawing. FIG. 21(b) shows the braking control signal generated by the fourth drum motor controller 55. The braking control signal is generated at specified intervals asynchronously with the scanning phase of the rotary head, and the brake mechanism control circuit 102 applies brake to the drum motor 50 according to the braking control signal generated. FIG. 21(c) shows the change in the rotation number of the drum motor 50 according to the rotation number control by the brake mechanism control circuit 102. Because the braking force is applied to the drum motor 50 according to the braking control signal outputted from the fourth drum motor controller 55, the rotation number of the drum changes around the rotation number of the drum 4500 rpm of the normal playback as shown in FIG. 21(c). The drive voltage level during high-speed playback is set higher than that of normal playback, so that the rotation number of the drum during high-speed playback changes around the rotation number of the drum 4500 rpm of normal playback. The reason for setting the center of the change of the rotation number of the drum at the rotation number of the drum of normal playback has been described in the fifth embodiment, and therefore will be omitted here. It is also as described before that the center may not be set at the rotation number of the drum of normal playback. As the brake mechanism control circuit 102 applies braking force at specified intervals to decrease the rotation number of the drum motor, the rotation number of the drum rapidly decreases in the braking period ① in FIG. 21(b), and the rotation number of the drum gradually increases in the period without braking ②. Thus the rotation number of the drum changes as shown in FIG. 21(c) under the control of the brake mechanism control circuit 102. From FIG. 21(c), the average of the rotation numbers of the drum can be regarded as equal to the rotation number of the drum during normal playback. In this embodiment, the brake mechanism control circuit 102 applies brake force for specified periods at specified intervals during double-speed playback, to change the rotation number of the drum so that the average thereof becomes the rotation number of the drum during normal playback.

The relative position of the trace of head scanning and the magnetic tape when the rotation number of the drum motor 50 is set as described above is as shown in FIG. 22(a). While the trace of scanning indicated by dashed line in FIG. 22(a) represents the trace of scanning by the rotary head when the rotation number of the drum motor 50 is fixed at the number during normal playback, the trace of scanning by the rotary head when the rotation number of the drum motor 50 is changed so that the average rotation number becomes approximately equal to the rotation number of the drum during normal playback as shown in FIG. 21(c) becomes as indicated by the curve in FIG. 22(a) according to the rotation number of the drum. Because the rotary heads have azimuth angles different from each other, signals corresponding to the shaded portion in the drawing represent the information reproduced by the rotary heads 8a, 8b of the respective channels. FIG. 22(b) shows the signals reproduced by the rotary head 8a during double-speed playback, with time being plotted along the abscissa and the amplitude of the reproduced signal outputted from the rotary head 8a during high-speed playback being plotted along the ordinate. In the description that follows, it is assumed that such a portion of the signals reproduced by the rotary head 8a can be correctly restored by the error correction function that the amplitude of the reproduced signal is not less than 50% of the amplitude obtained during normal playback. The trace of scanning by the rotary head 8a during double-speed playback shown in FIG. 22(a) depicts a case of extremely violent changes in the rotation number of the drum for the convenience of description.

FIG. 22(c) shows the playback state of the track A1 synthesized by using the memory according to the playback output chart shown in FIG. 22(b). The data recorded at the bottom of the track A1 to the data recorded at the top of the track A1 are successively placed in the drawing starting at the leftmost position. Amplitudes of the reproduced signals are plotted along the ordinate. As shown in FIG. 22(c), data recorded at all positions of the track A1 is restored. Data recorded at all positions of the track can be obtained also from the other nine tracks, though details will be omitted.

As described above, although information recorded in the fixed position of a track is not reproduced at all resulting in a fixed pattern appearing in the reproduced picture when double-speed playback is carried out with the normal rotation number of the drum in a home digital VTR, the reproduced track pattern is shifted a little when the rotation number of the drum is changed with a certain amplitude around the rotation number of the drum of the normal playback in this embodiment, thus reproduced information from all positions of each track can be obtained by synthesizing the reproduced information by using the memory even during double-speed playback.

It has been described in the fifth embodiment that the average of the changing values of the rotation number of the drum is made to be equal to the rotation number of the drum during normal playback, and therefore will not be described here. The problem of decrease in the decoding processing capability due to the reduction of the decoding processing time is not experienced in this embodiment as in the case of the fifth and sixth embodiments.

Although the rotation number of the drum is changed by means of the braking mechanism to make the center of the changes equal to the rotation number of the drum during normal playback so that the average rotation number of the drum is nearly equal to the rotation number of the drum of normal playback in this embodiment, the center of the changing rotation numbers of the drum may be made higher than that of normal playback so that the rotation number of the drum changes around the center of the rotation number of the drum which is higher than that of normal playback, if sufficient decoding time is available. The rotation number of the drum may also be changed around a rotation number of the drum lower than that of normal playback. The timing of generating the brake pulses is not restricted to that described above, and similar effect can bO obtained by braking when the rotation number of the drum exceeds a specified value and releasing the brake when the number decreases below a specified level.

As described above, the problem that data recorded at particular positions of the track is not reproduced at all during double-speed playback is solved by using the drum motor controller installed in the magnetic recording and reproduction apparatus of this embodiment. Consequently, it is made possible to solve the problem a that fixed pattern appears on the reproduced picture in a magnetic recording and reproduction apparatus which carries out reproduced signal processing by using image memory can be solved to obtain good multispeed playback pictures.

Embodiment 8

The eighth embodiment of the invention will now be described. In the embodiments described above, the problem that data recorded at particular positions of the track is not reproduced at all so that a fixed pattern appears on the reproduced picture during double-speed playback (or playback at the normal speed multiplied by an integer N) is solved by changing the rotation number of the drum from the rotation number of the drum of normal playback during high-speed playback. This embodiment solves a problem that the clock signals outputted from the data detection circuit during normal playback becomes unstable because the relative speed of the rotary heads 8a, 8b and the magnetic tape 9 changes in the process described above, thereby changing the frequency bandwidth of the reproduced digital signals (particularly the instability of the PLL circuit operation during normal playback is prevented).

The block diagram of the playback section of the magnetic recording and reproduction apparatus in the eighth embodiment of the invention is the same as that of the fourth embodiment shown in FIG. 12, and the operation thereof is also the same and the description thereof will be omitted.

The block diagram of the drum motor control section of the magnetic recording and reproduction apparatus in the eighth embodiment of the invention is the same as that of the first embodiment shown in FIG. 6, and the operation thereof is also the same and the description thereof will be omitted.

In this embodiment, the maximum recording frequency (denoted as fmax) when reproducing at the normal rotation number of the drum is set to 27 MHz. The rotation number of the drum during normal playback in this embodiment is also set to 4500 rpm as in the case of the above embodiment. A case of periodically changing the rotation number of the drum from 4500 rpm during high-speed playback will be described. In this embodiment, a case of changing the rotation number of the drum with an amplitude of 5% around 4500 rpm at the center, namely changing periodically between 4275 rpm and 4725 rpm, will be described. Therefore the frequency of the reproduced data changes between 25.65 MHz and 28.35 MHz.

Jitters contained in the reproduced signals during normal playback are generally within several percent, and clock signal generation is controlled so that the VCO generates clock signals, preferably linearly, in an adjustable bandwidth of several percent around a central frequency. As the adjustable frequency bandwidth of the VCO increases, a clock signal phase becomes more sensitive to disturbances such as noise and becomes unstable, resulting in instability of the clock phase generated by the VCO in the data detection circuit. Consequently, satisfactory data cannot be obtained when detecting data from the reproduced signals and applying time domain correction. In the normal playback, in particular, instability of the clock phase degrade the picture quality to make it uncomfortable to watch the screen.

When the rotation number of the drum is changed during high-speed playback as in this embodiment by using the VCO having the central frequency at 27 MHz for the normal playback, the PLL circuit (VCO) must be controlled to lock the frequency within the adjustable bandwidth of at least ±5% from 27 MHz. However, when the bandwidth is controlled in a range beyond 10%, the clock signal generated by the PLL circuit in the data detection circuit becomes unstable due to the noise and other causes as described above.

For the reason described above, this embodiment employs two or more VCOs with one VCO being set for frequency bandwidth about 10% wider than the case of normal playback to provide for high-speed playback, and another providing for the maximum recording frequency during normal playback. When reproducing at a high frequency, the operation is switched to the VCO for the high-speed playback so that stable clock signals can be generated to provide for the high-speed playback. During normal playback in which case deterioration of the picture quality becomes very noticeable to the eye, the VCO having the adjustable frequency bandwidth restricted to several percent is used to generate the playback clock signal, thereby enabling stable supply of the clock signals generated by the data detection circuit.

FIG. 13 is a block diagram of the data detection circuits 28a, 28b installed in the magnetic recording and reproduction apparatus of the eighth embodiment of the invention. In FIG. 13, numeral 30 denotes the integral detection circuit which integrates the reproduced signal outputted from the head amplifier 10. Numerals 31a, 31b denote the phase comparators which compare the phases of the reproduced signal outputted from the integral detection circuit 30 and the playback clock signal. Numerals 32a, 32b denote the first VCO and the second VCO which oscillate in the adjustable frequency range for the normal playback and in the adjustable frequency range for the high-speed playback, respectively. The first PLL circuit 33a comprises the phase comparator 31a and the first VCO 32a, and the second PLL circuit 33b comprises the phase comparator 31b and the second VCO 32b. Numeral 34 denotes the flip-flop circuit which latches the output of the integral detection circuit 30 according to the clock signals from the first PLL circuit 33a and the second PLL circuit 33b. Numeral 35 denotes the switch which switches between the outputs from the first PLL circuit 33a and the second PLL circuit 33b depending on whether normal playback or high-speed playback is selected. The operations of the data detection circuits 28a, 28b during normal playback will now be described below with reference to FIG. 13. The reproduced signals are amplified by the head amplifiers 10a, 10b and, when reproduced data is detected by the integral detection circuit 30, the first PLL circuit 33a is selected according to the normal playback mode signal outputted from the system controller 101 and playback clock signals are generated by the first VCO 32a which is an oscillator tuned for the maximum recording frequency of the normal playback. The phase comparator 31a compares the phases of the reproduced data detected by the integral detection circuit 30 and the playback clock signal outputted from the first VCO 32a. At this time output of clock signals of stable frequency is made possible because the adjustable frequency bandwidth of the first VCO 32a is set within a range of several percent. Based on the result of phase comparison in the phase comparator 31a, the first VCO 32a outputs the clock signals of the frequency tuned to the jitter included in the reproduced signals. The output from the integral detection circuit 30 is latched in the flip-flop circuit 34 by the clock signal outputted from the first PLL circuit 33a, and is outputted to the digital demodulation circuits 12a, 12b.

The operation of the data detection circuits 28a, 28b during double-speed playback will now be described below with reference to FIG. 13. The reproduced signals are amplified by the head amplifiers 10a, 10b and, when reproduced data is detected by the integral detection circuit 30, the second PLL circuit 33b is selected according to the double-seed playback mode signal outputted from the system controller 101, and playback clock signals are generated by the second VCO 32b which is an oscillator tuned for the adjustable frequency bandwidth of high-speed playback. The phase comparator 31b compares the phases of the reproduced data detected by the integral detection circuit 30 and the playback clock signal outputted from the second VCO 32b. Based on the result of phase comparison in the phase comparator 31b, the second VCO 32b outputs the clock signals of the frequency tuned to the jitter included in the reproduced signals. The output from the integral detection circuit 30 is latched in the flip-flop circuit 34 by the clock signal outputted from the second PLL circuit 33b, and is outputted to the digital demodulator circuits 12a, 12b.

In this embodiment wherein at least two VCOs are provided as described above, to change the rotation number of the drum from the normal rotation number of the drum during high-speed playback, one VCO is set for wider adjustable frequency bandwidth for high-speed playback with the two VCOs being used by switching them depending on whether the playback is done at the normal speed or at a high speed. Thus making it possible to supply stable reproduced signals during normal playback, and even when the rotation number of the drum is changed during high-speed playback, clock signals for multispeed playback can be generated because the adjustable frequency bandwidth is set wider than in the case of normal playback.

Although this embodiment is described for a case of changing the rotation number of the drum periodically during high-speed playback, it is not restricted to this arrangement and the same effect can be obtained by changing the rotation number of the drum by a fixed amount from that of normal playback. Also this embodiment is described in a case of double-speed playback, though the same effect can be obtained with the normal speed multiplied by another number. The same effect can also be obtained with a tape running speed which is the normal speed multiplied by a non-integer number.

Embodiment 9

The above embodiment is described for a case of a VTR employing the 2-channel recording system as shown in FIG. 3, though the invention is not limited to this arrangement and satisfactory high-speed playback can also be realized with multichannel recording system or single channel recording system.

Embodiment 10

Although the above embodiment is described in a case of digital VTR employing 2-channel 5-segment recording system as an example of VTR employing the segment recording system, the invention is not limited to these arrangement and the same affect can be obtained with a VTR employing multi-segment recording system such as a case wherein information of two frames is recorded in ten tracks by using 2-channel rotary heads.

Embodiment 11

The invention does not depend on the arrangement of the rotary heads or on the wrap angle of the tape, but on the number of channels on which the rotary heads operate in recording the 1-frame (1-field), 2-frame or other unit picture and on the number of segments in which the information is divided when recording, and the same effect can be obtained if multi-channel, multi-segment recording system is employed. The number of segments is set as follows for convenience in such an embodiment as described above. Let the number of rotary heads arranged on the rotary drum be NC, pay attention for example to the rotary head which recorded the first track of one picture frame, and let the number of tracks recorded before the rotary head next records the first track of one picture frame again be TC. Then the number of segments S is given as S=TC/NC. This definition of the number of segments does not necessarily agree with the number of segments because it varies depending on the depth of interleave with the above unit of picture and other factors.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magnetic recording and reproducing apparatus for preventing fixed pattern noise from appearing in a reproduced image when reproducing at a tape speed greater than a normal tape speed wherein digital video signals are divided into a plurality of segments S and are recorded in diagonal tracks on a magnetic tape by rotary heads which are mounted on a rotary drum, comprising:

a drum motor driving the rotary drum;

rotation number setting means for setting a rotation number of said drum motor; and a drum motor rotation controller outputting a drum motor control signal to control said drum motor so that the rotation number of said drum motor becomes the rotation number set by said rotation number setting means; wherein when reproducing at an integer multiple N times a normal tape speed, said rotation number setting means sets the rotation number of said drum motor so as to satisfy N×Q×k≢0 (mod S) so that the rotation number of said drum motor becomes the rotation number R utilized during normal tape speed reproducing multiplied by (1+q/Q)

wherein Q and q are integers satisfying |q|<|Q|; and k is a natural number satisfying k≦S−1.

2. A magnetic recording and reproduction apparatus of claim 1, further comprising:

at least two voltage-controlled oscillators having different adjustable frequency bandwidths; and reproduced data detecting means for detecting the reproduced data by using the voltage-controlled oscillator having the wider adjustable frequency range during high-speed playback.

3. A magnetic recording and reproduction apparatus of claim 2, wherein the number of drum FG pulses is set to a number different from that of normal playback thereby to control the rotation number of said rotary drum at a value different from that of normal playback according to the number of input FG pulses.

4. A magnetic recording and reproduction apparatus of claim 1, wherein the number of drum FG pulses is set to a number different from that of normal playback thereby to control the rotation number of said rotary drum at a value different from that of normal playback according to the number of input FG pulses.

5. An apparatus having a rotary drum that records to and reproduces from a magnetic tape for preventing fixed pattern noise from appearing in a reproduced image when reproducing at a tape speed greater than a normal tape speed, comprising:

a tape drive, driving the magnetic tape at a normal tape speed and at a high tape speed which is an integer N multiple of the normal tape speed;

a drum motor, driving a rotary drum at a drum speed including a normal drum speed corresponding to the normal tape speed;

a drum speed setting means for determining a rotation number of said drum motor; and a drum motor controller controlling said drum motor such that the drum speed is substantially equal to the rotation number determined by said drum speed setting means;

wherein when reproducing signals from the magnetic tape at the high tape speed, said drum speed setting means sets the rotation number to be the normal drum speed multiplied by (1+q/Q);

wherein said drum speed setting means sets the rotation number so as to satisfy N×Q×k≢0 (mod S); and where S represents a number of segments that are used to record a signal onto the magnetic tape, Q and q are integers satisfying |q|<|Q|, and k is a natural number satisfying k≦S−1.

6. A method for preventing fixed pattern noise from appearing in a reproduced image when reproducing at a tape speed greater than a normal tape speed that records to and reproduces from a magnetic tape using a rotary drum, comprising the steps of:

driving the magnetic tape at a normal tape speed and at a high tape speed which is an integer N multiple of the normal tape speed;

driving the rotary drum at a drum speed including a normal drum speed corresponding to the normal tape speed;

determining a rotation number of said rotary drum; and controlling said rotary drum such that the drum speed is substantially equal to the rotation number determined by said determining a rotation number step;

wherein when reproducing signals from the magnetic tape at the high tape speed, said determining a rotation number step sets the rotation number to be the normal drum speed multiplied by (1+q/Q);

wherein said determining a rotation number step sets the rotation number so as to satisfy N×Q×k≢0 (mod S); and where S represents a number of segments that are used to record a signal onto the magnetic tape, Q and q are integers satisfying |q|<|Q|, and k is a natural number satisfying k≦S−1.

7. A magnetic recording and reproducing apparatus for preventing fixed pattern noise from appearing in a reproduced image when reproducing at an integer multiple N times a normal tape speed (N>1) wherein digital video signals are divided into a plurality of segments and are recorded in diagonal tracks on a magnetic tape by rotary heads which are mounted on a rotary drum, comprising:

a drum motor driving the rotary drum;

rotation number setting means for setting a rotation number of said drum motor; and a drum motor rotation controller outputting a drum motor control signal to control said drum motor so that the rotation number of said drum motor becomes the rotation number set by said rotation number setting means; wherein when reproducing at the integer multiple N times the normal tape speed, said rotation number setting means sets the rotation number of said drum motor so that the rotation number of said drum motor must be a non-integer multiple of the rotation number utilized during normal tape speed reproducing such that the rotary heads deviate from a fixed rotary scanning trace when reproducing at the integer multiple N times the normal tape speed (N>1) so as to obtain all portions of an image.

8. An apparatus having rotary heads mounted on a drum that records to and reproduces from a magnetic tape for preventing fixed pattern noise from appearing in a reproduced image when reproducing at an integer multiple N times a normal tape speed (N>1), comprising:

a tape drive, driving the magnetic tape at a normal tape speed and at a high tape speed which is the integer multiple N times the normal tape speed;

a drum motor, driving a rotary drum at a drum speed including a normal drum speed corresponding to the normal tape speed;

a drum speed setting means for determining a rotation number of said drum motor; and a drum motor controller controlling said drum motor such that the drum speed is substantially equal to the rotation number determined by said drum speed setting means;

wherein when reproducing signals from the magnetic tape at the high tape speed, said drum speed setting means sets the rotation number such that the rotation number must be the normal drum speed multiplied by a non-integer number so that the rotary heads deviate from a fixed rotary scanning trace produced at normal tape speed.

9. A method for preventing fixed pattern noise from appearing in a reproduced image when reproducing at an integer multiple N times a normal tape speed (N>1) that records to and reproduces from a magnetic tape using rotary heads mounted on a drum, comprising the steps of:

driving the magnetic tape at a normal tape speed and at a high tape speed which is the integer multiple N times the normal tape speed;

driving the rotary drum at a drum speed including a normal drum speed corresponding to the normal tape speed;

determining a rotation number of said rotary drum; and controlling said rotary drum such that the drum speed is substantially equal to the rotation number determined by said determining a rotation number step;

wherein when reproducing signals from the magnetic tape at the high tape speed, said determining a rotation number step sets the rotation number such that the rotation number must be the normal drum speed multiplied by a non-integer number so that the rotary heads deviate from a fixed rotary scanning trace produced at normal tape speed.

10. An apparatus having rotary heads mounted on a drum that records to and reproduces from a magnetic tape for preventing fixed pattern noise from appearing in a reproduced image when reproducing at a tape speed greater than a normal tape speed, comprising:

a tape drive, driving the magnetic tape at a normal tape speed and at a high tape speed which is faster than the normal tape speed;

a drum motor, driving a rotary drum at a drum speed including a normal drum speed corresponding to the normal tape speed;

a drum speed setting means for determining a rotation number of said drum motor; and a drum motor controller controlling said drum motor such that the drum speed is substantially equal to the rotation number determined by said drum speed setting means;

means for preventing fixed pattern noise when reproducing signals from the magnetic tape at the high tape speed by setting the rotation number at the high tape speed such that the rotation number at the high tape speed must be the rotation number at the normal tape speed multiplied by a non-integer number so that the rotary heads deviate from a fixed rotary scanning trace produced at normal tape speed.

* * * * *